United States Patent
Burdick

(10) Patent No.: US 9,848,588 B2
(45) Date of Patent: *Dec. 26, 2017

(54) CONVERTIBLE FISHING LURE ASSEMBLY

(71) Applicant: Burdick Consulting Services LLC, Umatilla, FL (US)

(72) Inventor: Jon Scott Burdick, Umatilla, FL (US)

(73) Assignee: Burdick Consulting Services LLC

( * ) Notice: Subject to any disclaimer, the term of this patent is extended or adjusted under 35 U.S.C. 154(b) by 328 days.

This patent is subject to a terminal disclaimer.

(21) Appl. No.: 14/566,086

(22) Filed: Dec. 10, 2014

(65) Prior Publication Data

US 2015/0089858 A1    Apr. 2, 2015

Related U.S. Application Data

(63) Continuation-in-part of application No. 13/541,341, filed on Jul. 3, 2012, now Pat. No. 8,915,012, which is a continuation-in-part of application No. 12/661,730, filed on Mar. 23, 2010, now abandoned.

(51) Int. Cl.
  *A01K 85/16* (2006.01)
  *A01K 85/18* (2006.01)

(52) U.S. Cl.
  CPC ............ *A01K 85/16* (2013.01); *A01K 85/18* (2013.01)

(58) Field of Classification Search
  CPC ......... A01K 85/00; A01K 85/16; A01K 85/18
  USPC ........... 43/42.03, 42.06, 42.09, 42.15, 42.22, 43/42.23, 42.36, 42.49
  See application file for complete search history.

(56) References Cited

U.S. PATENT DOCUMENTS

| | | | |
|---|---|---|---|
| 2,036,954 A | 4/1936 | Murray | |
| 2,295,292 A | 9/1942 | Rogers | |
| 2,563,282 A | 8/1951 | Schenck | |
| 2,565,205 A * | 8/1951 | Culver | A01K 85/16 43/42.06 |
| 2,593,792 A * | 4/1952 | Reckler | A01K 85/16 43/42.33 |
| 3,867,781 A | 2/1975 | Wolfe | |
| 3,973,349 A | 8/1976 | England | |

(Continued)

FOREIGN PATENT DOCUMENTS

| | | |
|---|---|---|
| FR | 1148408 | 12/1957 |
| FR | 2409697 | 6/1979 |

*Primary Examiner* — David Parsley
(74) *Attorney, Agent, or Firm* — Malloy & Malloy, P.L.

(57) ABSTRACT

A convertible fishing lure assembly includes a lure body having at least one body section and a channel extending longitudinally therethrough and terminating in oppositely disposed open ends. A securing member, and in at least some embodiments a sleeve, is removably disposable within the channel. The securing member is dimensioned and disposed to include opposite ends being simultaneously disposed through the open ends of the channel for connection to fishing tackle components disposed exteriorly of the body section. Both the channel and the securing member have corresponding cross-sectional configurations to restrict rotation of the securing member within the channel. The lure body may include a plurality of body sections each having a channel extending therethrough with a securing member removably disposed therein, wherein the body sections are movably interconnected to one another through interconnection of corresponding ends of the different securing members.

20 Claims, 13 Drawing Sheets

(56) References Cited

U.S. PATENT DOCUMENTS

| | | | |
|---|---|---|---|
| 3,973,350 A | 8/1976 | England | |
| 4,010,569 A | 3/1977 | Finley et al. | |
| 4,098,017 A | 7/1978 | Hall | |
| 4,121,366 A | 10/1978 | McClellan | |
| 4,163,337 A | 8/1979 | Kress | |
| 4,337,591 A | 7/1982 | Gell et al. | |
| 4,611,422 A | 9/1986 | Hampton | |
| 4,642,933 A | 2/1987 | Brown | |
| 4,649,663 A | 3/1987 | Strickland | |
| 4,697,378 A | 10/1987 | Tunstall | |
| 4,745,699 A | 5/1988 | Gage | |
| 4,777,757 A | 10/1988 | de Marees van Swinderen | |
| 4,796,375 A | 1/1989 | Wilson | |
| 4,803,798 A | 2/1989 | Hannah | |
| 4,831,768 A | 5/1989 | Sorace | |
| 4,873,781 A | 10/1989 | Bates | |
| 4,914,849 A | 4/1990 | Hook | |
| 4,941,280 A | 7/1990 | Rinaldi | |
| 4,944,112 A | 7/1990 | Garmany et al. | |
| 4,998,371 A * | 3/1991 | Driesel | A01K 85/10 43/42.16 |
| 5,042,189 A | 8/1991 | Bailey | |
| 5,090,151 A | 2/1992 | Salminen | |
| 5,097,620 A | 3/1992 | Nietupski | |
| 5,113,607 A | 5/1992 | Pate | |
| 5,113,608 A | 5/1992 | Hook | |
| 5,142,811 A | 9/1992 | Freeman | |
| 5,167,089 A | 12/1992 | Schriefer | |
| 5,185,950 A | 2/1993 | Hood | |
| 5,197,220 A | 3/1993 | Gibbs et al. | |
| 5,232,223 A | 8/1993 | Dornbusch | |
| 5,261,182 A | 11/1993 | Link | |
| 5,369,906 A | 12/1994 | Anterni | |
| 5,406,738 A | 4/1995 | Holleman, Sr. | |
| 5,428,916 A | 7/1995 | Dubriske | |
| 5,485,697 A | 1/1996 | Watson et al. | |
| 5,595,013 A | 1/1997 | Dubriske | |
| 5,596,831 A | 1/1997 | McWethy, Jr. | |
| 5,678,349 A | 10/1997 | Pacora | |
| 5,758,450 A * | 6/1998 | Young | A01K 85/01 43/17.6 |
| 5,845,644 A | 12/1998 | Hughes et al. | |
| 5,893,232 A | 4/1999 | Horton et al. | |
| 5,926,994 A | 7/1999 | Mason et al. | |
| 5,953,849 A | 9/1999 | Boucher, Jr. | |
| 6,006,464 A | 12/1999 | Tregre | |
| 6,006,465 A | 12/1999 | Brown et al. | |
| 6,047,492 A | 4/2000 | Watson et al. | |
| 6,052,938 A | 4/2000 | Marusak et al. | |
| 6,058,643 A | 5/2000 | Marusak et al. | |
| 6,058,645 A | 5/2000 | Lummis | |
| 6,108,962 A | 8/2000 | Barron | |
| 6,108,963 A | 8/2000 | Lucas et al. | |
| 6,122,855 A | 9/2000 | Heuke | |
| 6,141,900 A | 11/2000 | Rudolph | |
| 6,226,917 B1 | 5/2001 | Sylla et al. | |
| 6,325,066 B1 | 12/2001 | Hughes et al. | |
| 6,354,037 B2 | 3/2002 | Coppola, Jr. | |
| 6,357,167 B1 | 3/2002 | Bradford | |
| 6,361,436 B1 | 3/2002 | Gouji et al. | |
| 6,389,735 B1 | 5/2002 | Holt | |
| 6,402,617 B2 | 6/2002 | Gouji et al. | |
| 6,598,336 B2 | 7/2003 | Link | |
| 6,640,487 B2 | 11/2003 | Angwin | |
| 6,675,524 B2 | 1/2004 | McNally et al. | |
| 6,681,676 B2 | 1/2004 | Hayes et al. | |
| 6,684,556 B1 | 2/2004 | Arbuckle et al. | |
| 6,711,848 B1 | 3/2004 | Gammieri | |
| 6,922,938 B1 | 8/2005 | Ciuffo | |
| 7,469,497 B2 | 12/2008 | Hergott | |
| 7,469,498 B2 | 12/2008 | Brinker et al. | |
| 7,827,730 B1 | 11/2010 | Jensen et al. | |
| 2005/0028424 A1* | 2/2005 | Poinski | A01K 85/16 43/42.06 |
| 2006/0265936 A1 | 11/2006 | Wilkinson | |
| 2010/0205848 A1* | 8/2010 | Hughes | A01K 91/06 43/42.15 |

* cited by examiner

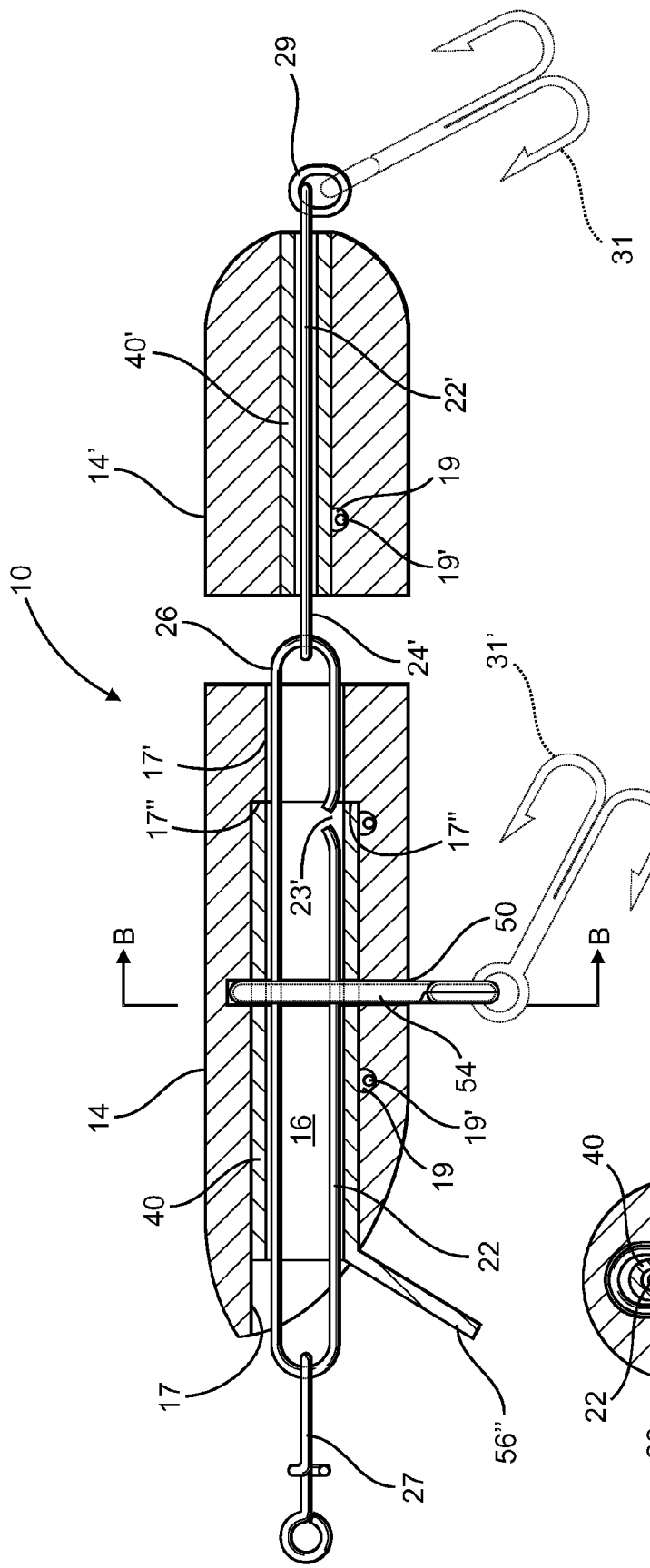
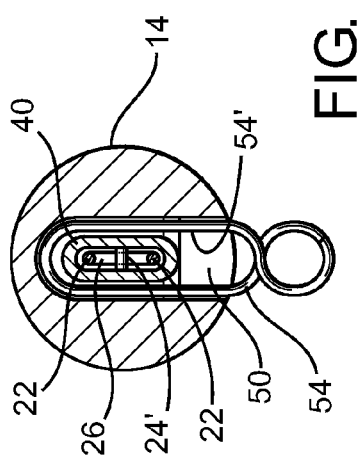
FIG. 2A
FIG. 2B

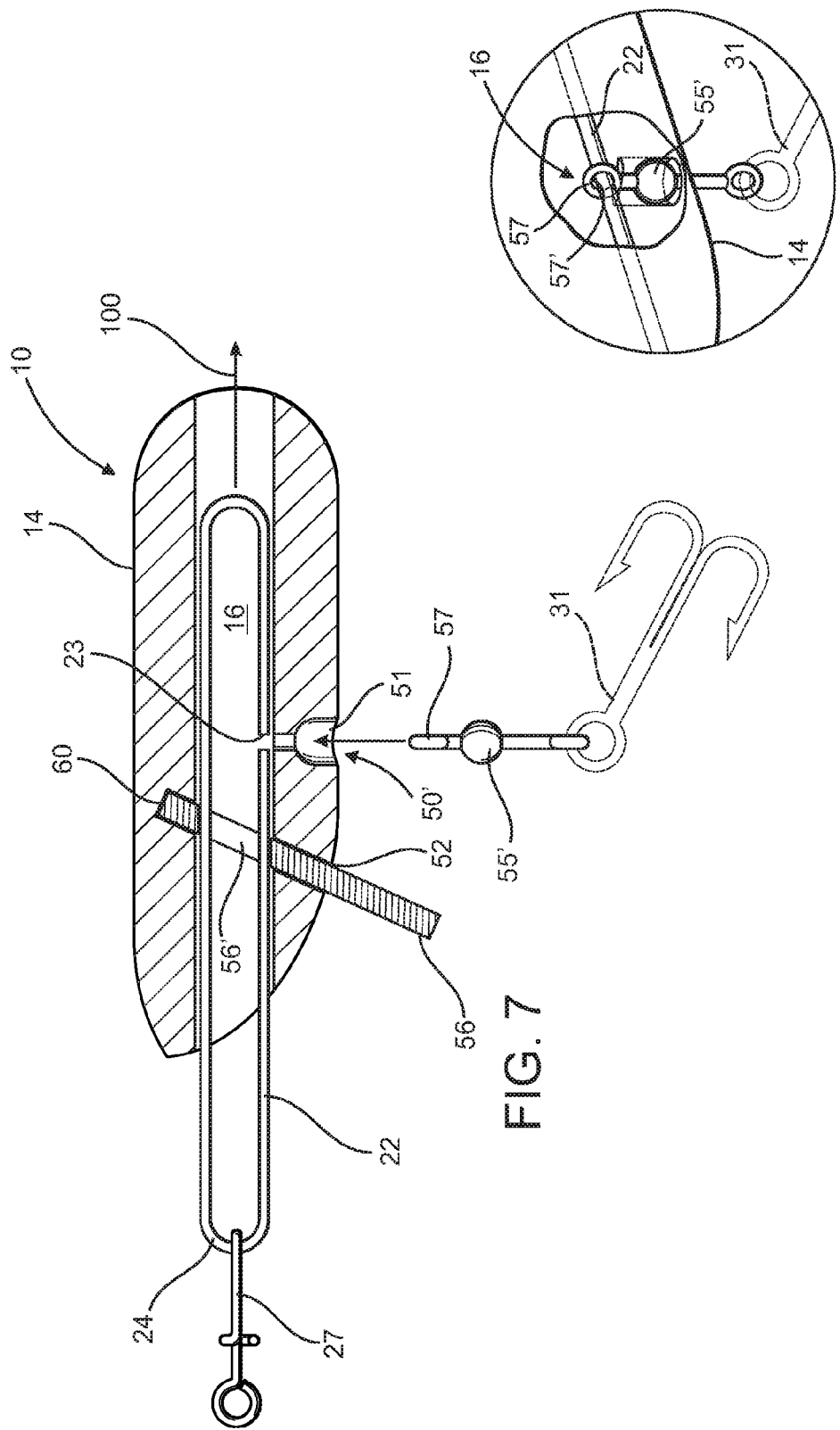

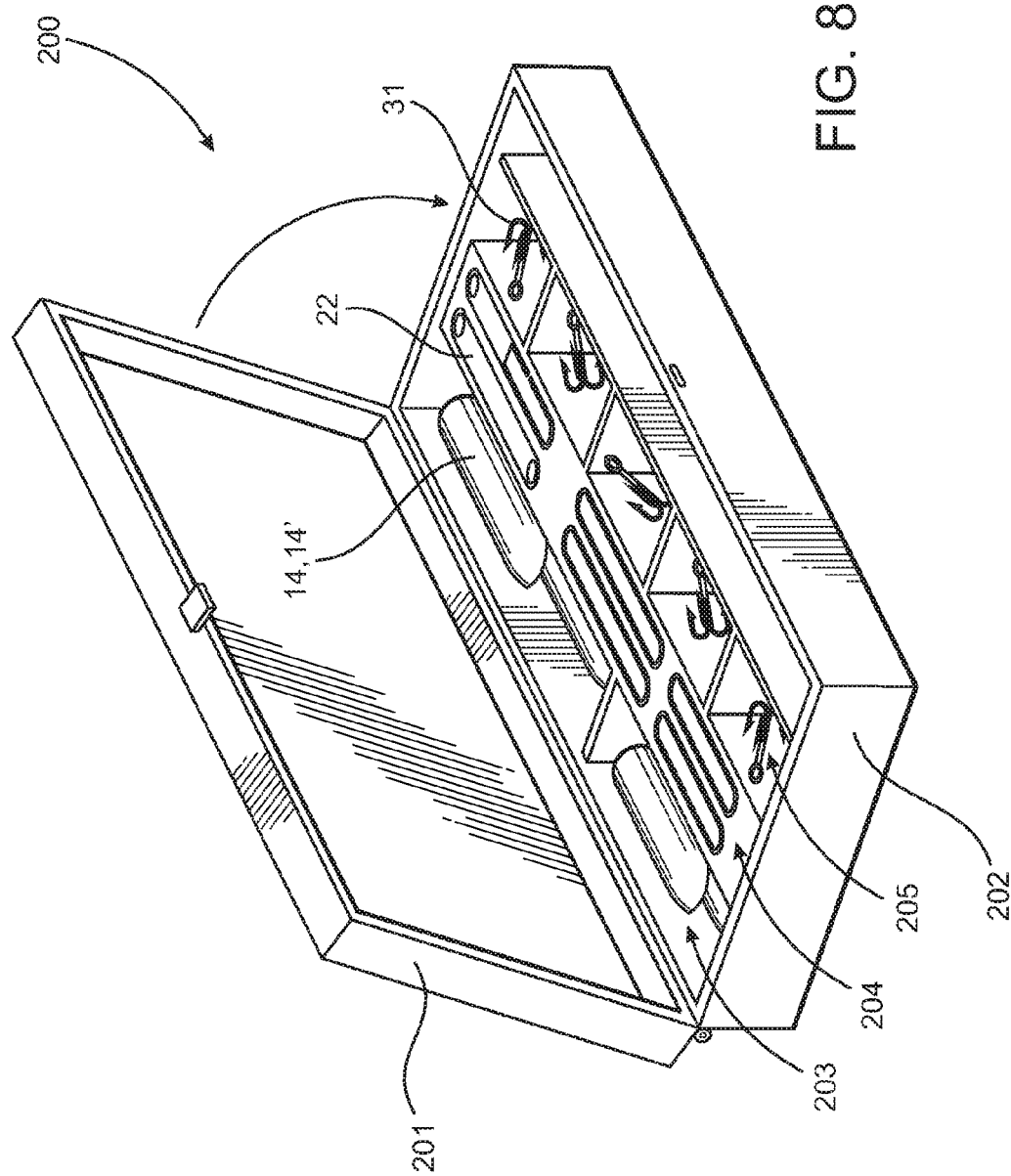

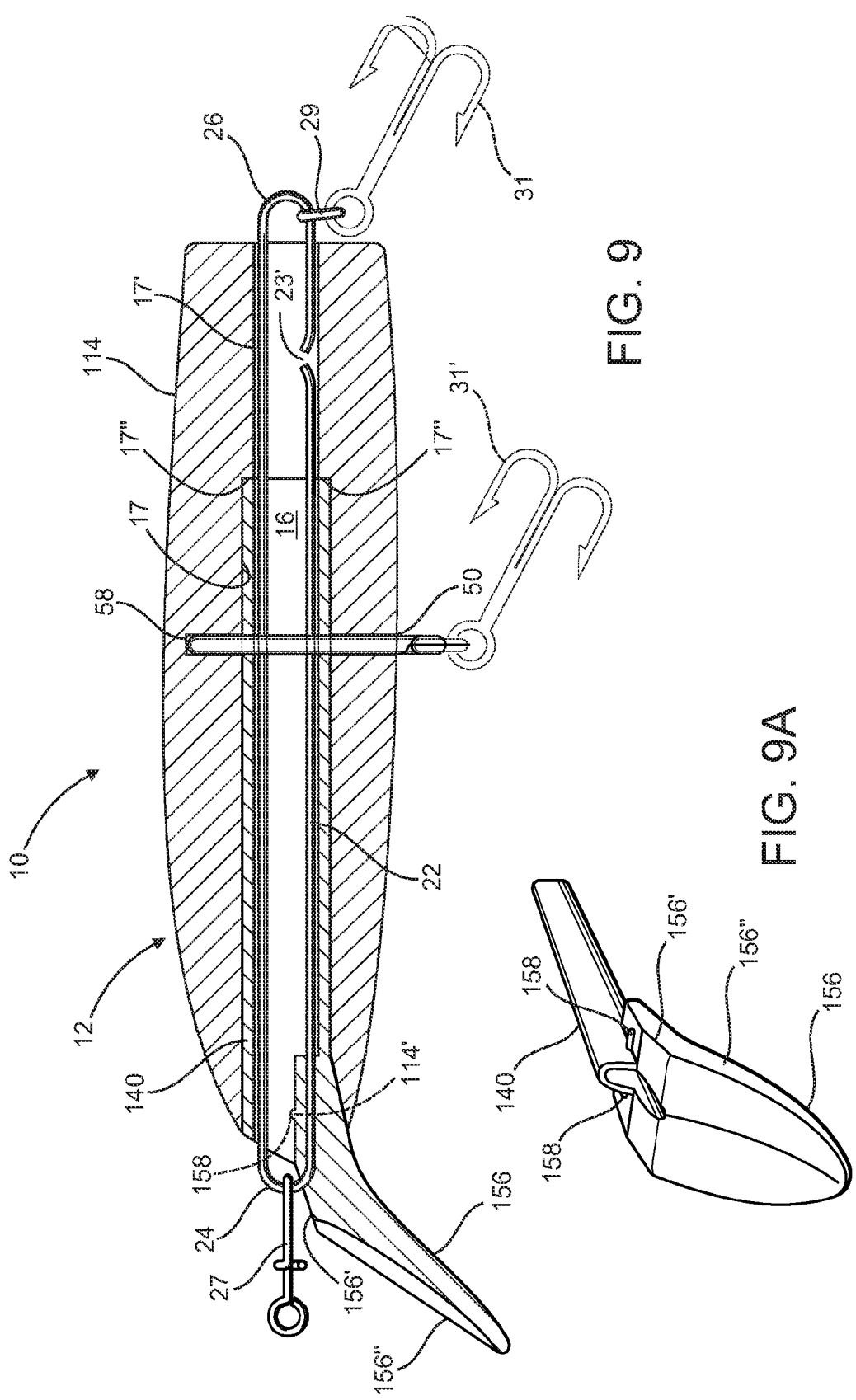

CONVERTIBLE FISHING LURE ASSEMBLY

BACKGROUND OF THE INVENTION

Field of the Invention

This invention is directed to a convertible fishing lure assembly including at least one body section having an elongated channel dimensioned and configured to removably receive a securing member therein and, in at least one embodiment, at least one body section comprises an elongated channel dimensioned and configured to further removably receive a sleeve therein. At least a portion of the elongated securing member extends outwardly from opposite ends of the channel of the body section, and a preselected tackle component is selectively and replacably attached to at least each of said outwardly extending ends, thereby facilitating the quick and efficient conversion of the structure, performance characteristics and/or appearance of the fishing lure assembly to accommodate the conditions and/or environment in which the fishing lure assembly is used.

Description of the Related Art

Fishing lures are commercially available in an extremely large variety of sizes, shapes, structures and appearances and are typically manufactured to display certain performance characteristics when used. By way of example, many lures, such as, but not limited to, those lures used by commercial and recreational fishermen for in-line trolling, are structured to be slidably mounted on a leader which is connected to the fishing line. One or more hook assembly is connected to the fishing line at the trailing end of the fishing lure utilizing any of plurality of fishing tackle components, such as snaps, swivels, etc., which may be disposed and structured to connect the hook assembly to the leader rather than directly to the body of the lure. The size and position of such connecting tackle components allow them to be used as stops to prevent the lures from sliding off the leaders and to prevent the leaders from being twisted. Therefore, when used, drag forces applied to the hook by a hooked fish is transferred directly from the hook to the leader/fishing line, and the lure does not absorb the force of the fish. In addition, in-line trolling lures of the type generally set forth herein frequently exhibit a free spinning or rotating feature about the supporting leader, wherein such spinning or rotation may add to the attraction of the targeted fish.

When using this type of in-line trolling lure, as well as a variety of other lure structures intended for different fishing environments, it is often desirable to change various structural features of the lure in order to vary the operational or performance characteristics as well as the appearance thereof. By way of example, it is often desirable to change the color of a lure and/or its trailing skirt to compensate for lighting changes caused by depth or weather, or simply when the lure or skirt becomes worn. In making such changes with conventional or known lure assemblies it is common place to cut or detach the leader just above the hook area so that the lure can be removed and replaced with another lure and/or different components of the existing lure such as the aforementioned skirt. After such replacement or conversion, the hook is then resecured to the leader. Such a procedure, while common place, takes a considerable amount of time, and as set forth above, may require cutting and therefore shortening of the leader, which in turn requires the leader itself to eventually be replaced.

Lure assemblies not primarily intended for in-line trolling, such as crank baits which are primarily designed for casting and retrieval, exhibit similar problems. Further, by way of example, such lure assemblies including a plurality of body portions of different shapes and sizes are known, wherein the body portions are replaceable in order to change the appearance and/or "action" of the lure when in use. However, changing, replacing or otherwise altering any of the various components of such a fishing lure body encompasses a number of same type of problems and disadvantages related to the time consuming difficulties in accomplishing the conversion of in-line trolling lures, as well as presenting additional problems. Such replacement or conversion is particularly troublesome during the harsh conditions frequently encountered by fishermen due to the weather and/or water conditions.

In addition to the above, different fishing tackle components such as attachment eyelets, hooks, diving bills, skirts, etc., are frequently supplied with and are often securely attached to such crank bait type lures for each of a number of specific intended uses. However, it is also a frequent occurrence that fishing tackle components provided with such lures are not the most desirable for all fishing conditions. As a result, hooks or other tackle components which are fixedly secured to the lure cannot be readily altered, thereby requiring the fishermen to either select a different lure, engage in a time consuming custom retrofit on location which may often require specialized tools, such as snap ring pliers, or simply settle for a lure which may not be as effective under the existing fishing conditions. Further, lures having a diving bill integrally attached thereto are rendered useless when the diving bill is damaged or broken, such as frequently happens through normal use, as well as through improper storage, i.e., when such a lure is stored together loose with other lures or tackle components.

Moreover, such lure assemblies typically have the hook assemblies permanently secured thereto which often results in the inadvertent "hooking" of a fishermen or other individual handling the lure, especially during transport of the lure to and from a fishing site. Further, fisherman must now often entrust a collection of expensive lures to the "checked baggage" handlers in an airport, seaport, etc., as constraints on travel continue to be implemented around the world.

In addition, a separate enclosure or container for each lure is desirable in order to prevent the hooks of one lure from becoming entangled with the hooks of other lures during storage and/or transport. As a result, the space requirement to store even a modest number of individual lures can be quite large, which is burdensome when a fisherman desires to bring a number of lures to a fishing site and/or otherwise transport or store the same. The requirement for such a large storage space is evidenced by the commercial availability of extremely large, compartmentalized tackle boxes structured to provide sufficient storage area for a variety of different lures and containers of the type set forth above.

Accordingly there is a significant and recognized need in the area of fishing lures for a convertible fishing lure assembly which is structured to permit quick and easy replacement of a plurality of different tackle components. Further, the needs exists for lure assembly which permit a plurality of hooks and other tackle components to be quickly and easily removed from and attached to a lure body, such that said tackle components may be stored and/or transported separately from the lure bodies, thereby greatly reducing the space requirement to store and/or transport a plurality of lures. Such a proposed convertible lure assembly, while being structured to facilitate the conversion of the structure, performance characteristics, appearance, etc., should also be structured to operate in a stable manner. As such, the lure body should be maintained in a specific, operative orientation and be prevented from spinning, twisting or rotating during fishing. Further, such a convertible lure assembly should not be allowed to freely slide along the leader or fishing line.

In order to accomplish the foregoing structural and operational characteristics, such a convertible fishing lure assembly should also facilitate the interconnection of the leader or fishing line to a hook assembly thereby allowing the force of a fish strike and/or the force of a hooked and fighting fish to be absorbed primarily by the leader and/or fishing line rather than the body of the convertible lure assembly itself. In addition, the unique structural and operative characteristics of such a convertible lure assembly should demonstrate sufficient versatility such that a lure assembly incorporating the aforementioned structural and operational characteristics may be used in trolling or non-trolling configurations, as may be required.

SUMMARY OF THE INVENTION

The present invention is directed to a fishing lure assembly structured to be convertible at least to the extent of quickly and efficiently adding, removing, and/or replacing one or more fishing tackle components which may be typically connected to or operatively associated with the lure body. As used herein the term "tackle component" is not meant to be interpreted in a limiting sense and is intended to refer to any of a plurality of conventional or customized fishing tackle accessories which could be attached or interconnected to a lure body. By way of example only, such tackle components could include, but are not limited to, fishing lines, leaders, hooks, diving bills, swivel and/or snap connectors and other interconnecting structures, as well as a variety of other decorative and/or utilitarian devices which may enhance the structure, performance, appearance and/or use of the lure.

More specifically, the convertible lure assembly of the present invention includes a lure body comprising at least one body section. The at least one body section includes an elongated channel extending longitudinally through the interior thereof and terminating in oppositely disposed open ends. In at least one embodiment, the elongated channel is completely enclosed along its length within the body section, with the exception of the oppositely disposed open ends. The open ends of the interior channel are disposed adjacent to and at least partially define the leading and trailing ends of the at least one body section.

The lure body or body section, in at least one embodiment, comprises a substantially hollow configuration having a channel extending longitudinally therethrough and terminating in oppositely disposed open ends. In at least one further embodiment, the channel includes an open cell configuration comprised of a plurality of interconnected open cells.

In addition, an elongated securing member is removably disposable within the channel and is of sufficient length to extend along the entire length thereof. As such, the elongated securing member includes oppositely disposed ends, each of which is disposed in communicating, accessible relation adjacent to the corresponding open ends of the interior channel. More in particular, the elongated securing member is of sufficient length to extend along the entire longitudinal length of a channel and further, each oppositely disposed end of the elongated securing member simultaneously extends outwardly from a corresponding oppositely disposed open end of the channel, when the elongated securing member is disposed in an operative position within the channel.

Moreover, the opposite ends of the securing member are accessible at corresponding ones of the open ends of the channel and are structured to facilitate connection to and retention of various fishing tackle components. Such tackle components may be of the type, but are not limited to, tackle components conventionally connected to the leading end of the lure body. Similarly, tackle components typically connected at the trailing end of the lure body may be removably attached to the corresponding end of the securing member, which is accessible through the open end of the interior channel at the trailing end of the lure body. In at least one embodiment, the lure body is structured to receive a plurality of hooks replacably secured thereto, at various positions along the length of the lure body, i.e., leading end, midsection, and/or trailing end, once again, via removable attachment to the securing member. As such, the securing member of the present invention serves as a skeleton or frame about which an essentially endless variety of lure body and/or tackle component configurations may be assembled, disassembled, and reconfigured as required to suit virtually any fishing condition encountered.

The interior channel and the securing member removably disposed therein are cooperatively dimensioned and configured to facilitate movable, sliding engagement therebetween. However, the channel and securing member are cooperatively configured to have sufficiently corresponding cross-sectional configurations to substantially restrict rotational movement of the securing member when disposed within the channel. Such cooperative and at least partially corresponding cross-sectional configurations of the channel and the securing member are generally defined by an oblong cross-sectional configuration. More specifically, the cross-sectional configuration of the channel may include a substantially oval or elliptical configuration extending along at least portion thereof, but in one embodiment along substantially the entire length thereof. Alternatively, the oblong configuration of the channel may be at least partially multisided, rather than elliptical or oval, and as such, may be accurately described as having a substantially rectangular cross-sectional configuration.

In cooperation therewith, the securing member may also have what may be generally, but accurately, described as an oblong cross-sectional configuration. Accordingly, the oblong configuration of the securing member substantially corresponds to the configuration of the channel in which it is removably disposed at least to the extent of having a major or long dimension and a minor or lesser dimension which are disposed in transverse relation to one another. As described in greater detail hereinafter, at least one embodiment of the present invention comprises the securing member having a cross-sectional configuration wherein its longer or major cross-sectional dimension is substantially the same as that of the channel and the shorter or minor cross-sectional dimension of the securing member is substantially the same as the shorter or minor dimension of the channel. However, for the purpose of the present invention, variances in the corresponding cross-sectional dimensions of the securing member and the channel define the channel and the securing member being "sufficiently corresponding" to prevent or at least restrict rotation of the securing member within the channel, when the securing member and lure body are operatively assembled.

Further, the oblong cross-sectional configuration of the various embodiments of at least the channel may comprise an oval, elliptical, rectangular, polygonal, or other multi-sided configuration. Such corresponding, cross-sectional configurations of the channel and a sufficiently corresponding oblong cross-sectional configuration of the securing member will significantly restrict rotation of the securing member once disposed within and extending along the longitudinal length of the interior channel. Once assembled, the tackle components of the types generally set forth above, which are secured to the opposite, leading or trailing ends of the securing member will automatically assume a transverse or at least generally perpendicular orientation relative to the major or longer dimension of the channel and securing member. As a result, passage of the tackle components replacably connected at either of the opposite ends of the securing member will be prevented from passing into or through the cross-sectional configuration of the channel. The securing member will thereby be maintained in a desired, operative position within the channel on the interior of the body section of the lure body with which it is associated.

As set forth in greater detail hereinafter, the structural characteristics of the securing member may vary, dependent at least in part on the intended application or specific structure of the lure body with which it is used. More specifically, one embodiment of the securing member includes an elongated loop-type structure formed of steel spring wire or other appropriate material having sufficient strength to facilitate and maintain connection to the aforementioned tackle components. Such a loop-type structure may further comprise an access opening defined by separated or separable correspondingly disposed end portions of the loop-type structure and/or configuration allowing access into an inner open area of the elongated loop-type securing member. This access opening formed in the loop-type securing member allows for the various tackle components to be easily and replacably interconnected thereto, such as when it is desired to assemble or change the various tackle components relative to the lure body. In at least one embodiment, each oppositely disposed end of an access opening are disposed in an inwardly directed configuration towards the opposite side of the securing member, so as to minimize potential snagging of the access opening while positioning it into or removing it from the channel. Moreover, while the loop-type securing member will generally have a substantially linear or straight line configuration along its length, at least one embodiment may include an angled, bent and/or enlarged configuration at one end thereof. Such differences in the configuration of the loop-type securing member better facilitates the adaptation of the securing member to body sections comprising different shapes, sizes, etc., with which it is used.

Alternatively, the structural features of the securing member may comprise its formation from a solid metallic or other appropriately strong and/or at least partially rigid material extending substantially entirely or only partially along the length of the securing member. When only a portion of the length of the securing member is formed from a solid material, the remaining portion thereof may be structured into a loop segment similar to the loop-like structure as described above. In this latter embodiment, the access opening may be disposed along the length of the loop segment. As above, in at least one embodiment, each oppositely disposed end of the access opening are disposed in an inwardly directed configuration towards the opposite side of the securing member. In contrast, when substantially the entire length of the securing member is formed from a solid material, i.e., having no inner open area, the opposite ends thereof are apertured or otherwise structured to facilitate connection of the various tackle components to both the leading and trailing opposite ends as will be more apparent hereinafter.

As set forth above, the lure body, and more specifically, the at least one body section thereof, may be converted in function and appearance by removably and replacably interconnecting one or more tackle components, such as, but not limited to, diving bills, additional hook(s), connectors, skirts, etc., to various portions thereof. Depending on the function of the tackle component, it may be connected to an intermediate portion of the body section between the leading and trailing ends of the lure body. Accordingly, one embodiment of the present invention includes the provision of at least one, but possibly a plurality of discrete attachment openings formed in the body section and being disposed, dimensioned and configured to receive at least a connecting portion of any one of a plurality of tackle components therein. More in particular, each discrete attachment opening is cooperatively dimensioned to receive a connecting portion of a single tackle component therethrough and into an operative orientation in the enclosed channel for securing engagement with a securing member or sleeve therein. As set forth above such tackle components may be intermediately disposed hook structures, diving bills, etc.

Therefore, the convertible lure assembly of the present invention may also include a tackle component assembly comprising at least one, but in at least some embodiments, comprises a plurality of tackle components of the type set forth herein. Further, each of the one or more tackle components include a connecting portion having an aperture or other appropriate structure associated therewith. The connecting portion of each lure assembly is capable of passing into at least one of the attachment openings such that the connecting portion is disposed in an aligned relation with the interior channel. As such, the connecting portion of the one or more tackle components is cooperatively dimensioned, configured and disposed, when aligned with the interior channel, to receive a portion of a securing member or sleeve therethrough or otherwise in retained relation with the connecting portion. Therefore, any one of the removably and replacably interconnected tackle components can be easily and quickly connected or replaced by disposing the securing member or sleeve at least partially outward from the interior channel, due to a sliding engagement there between. Once so disposed, a selected tackle component is inserted into an appropriate attachment opening until the connecting portion thereof is aligned with the channel. Repositioning of the securing member or sleeve into the interior of the channel will serve to dispose the securing member or sleeve in removable retaining relation to the connecting portion of the tackle component(s).

Yet another embodiment of the convertible lure assembly of the present invention comprises the lure body including a plurality of body sections wherein one or more of the body sections include an enclosed interior channel with the aforementioned oblong cross-sectional configuration extending along the lengths thereof. As also set forth above, the cross-sectional configurations of the securing members and respective ones of the channels are sufficiently corresponding to restrict rotation of the securing members within the respective channels. Further, the securing members and channels are cooperatively dimensioned and configured to removably dispose each of the securing members in the corresponding channel. As a result, adjacently disposed body sections may be removably interconnected to one another such as by removably interconnecting corresponding ends of the securing members associated therewith.

It is noted that the lure body may comprise more than two body sections wherein each of the plurality of body sections defining the lure body are movably interconnected to one another. Accordingly when each of the plurality of body sections includes the aforementioned interior elongated channels having cooperatively dimensioned and configured securing members removably disposed therein, the structures thereof will be substantially the same as described above, wherein the lure body comprises at least a single body section. As a result, the cooperative structuring of each of the securing members and corresponding ones of the channels associated with each body section facilitates a quick, easy and efficient conversion of the function, structure and appearance of the lure assembly. Such conversion is accomplished by enabling the removable connection and replacement of any of a plurality of fishing tackle components with which the lure body is associated.

Yet another embodiment of the convertible lure assembly of the present invention comprises a sleeve having a cross-sectional configuration substantially corresponding to that of the channel in which it is disposed. As such, the sleeve extends along at least a portion of the corresponding channel and is dimensioned to allow passage of securing member through the sleeve. The sleeve may be formed from a metallic or other appropriate material having sufficient rigidity and/or other physical properties which restrict wear or deterioration of the corresponding channel and/or body section. Such deterioration may be typically caused by repetitious insertion and removal of the securing member relative to the channel such as when the body section is formed from a less durable material such as, but not limited to, wood. As above, in at least one embodiment, the sleeve is dimensioned to engage a connecting portion of at least one tackle component in a removable retaining relation.

Other structural characteristics of the various embodiments of the lure assembly of the present invention include the body section(s) being formed from any of a variety of materials including, but not limited to, plastic, wood, metal, composite materials, etc. Further each of the one or more body sections may comprise a substantially solid construction, except for the aforementioned channel, or at least partially hollow construction. In at least one embodiment, one or more chamber may be formed in a body section, wherein each chamber is dimensioned to receive and retain at least one enhancement member therein. Moreover, different manufacturing techniques may be used in the formation of the body section(s). By way of example only, when a body section is formed from a plastic material it may be injection molded. When formed in this manner, one or more reinforcing segments, such as strips or particles of appropriate reinforcing material, may be integrally or otherwise incorporated into the body section so as to increase the strength thereof and accordingly extend the operable life of the body section so formed.

Therefore, the various embodiments of the convertible fishing lure assembly of the present invention overcomes many of the problems and disadvantages associated with known or conventional fishing lures, such as crank bait type lures, especially, but not exclusively, relating to the ability to quickly and easily change the appearance, structure and performance characteristics thereof.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2A is a longitudinal sectional view of one further embodiment of the convertible lure assembly in accordance with the present disclosure.

FIG. 2B is a cross-sectional view through the embodiment of FIG. 2A along lines B-B thereof.

FIG. 7 is a longitudinal sectional view of yet another embodiment of the convertible lure assembly in accordance with the present disclosure in partially assembled form.

FIG. 7A is a detailed view in partial cutaway of structural features of the embodiment of FIG. 7.

FIG. 8 is a perspective interior view of a lure and tackle storage and carrying assembly specifically structured to contain and organize various replaceable parts and tackle components of a plurality of convertible lure assemblies in accordance with the present disclosure.

FIG. 9 is a longitudinal sectional view illustrative of yet another embodiment of the convertible lure assembly in accordance with the present disclosure.

FIG. 9A is a perspective view of a sleeve comprising an integral diving bill in accordance with the embodiment of the convertible lure assembly of FIG. 9.

Like reference numerals refer to like parts throughout the several views of the drawings.

DETAILED DESCRIPTION

Figure 1:
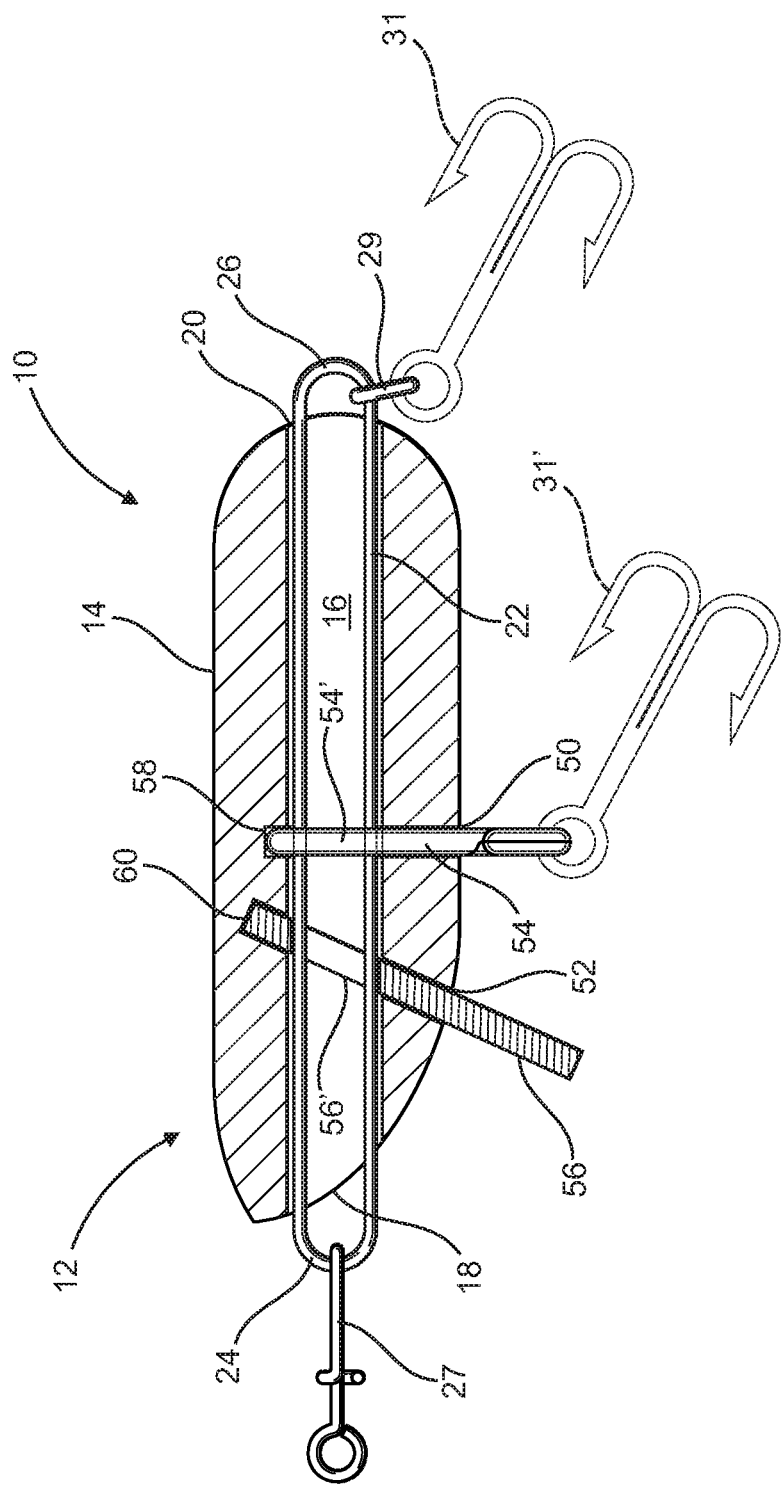
FIG. 1 is a longitudinal sectional view of one embodiment of the convertible lure assembly in accordance with the present disclosure.

As represented in the accompanying drawings, the present invention is directed to a convertible fishing lure assembly generally indicated as 10 and comprising a body 12 having at least one body section 14. The body section 14 includes an elongated, interior channel 16 having oppositely disposed open ends including a leading open end 18 and a trailing open end 20. In at least one embodiment, the elongated channel 16 is completely enclosed within a body section 14, such as is best illustrated by elongated channel 16 extending through body section 14' in the embodiment of FIG. 5, and is only accessible through its oppositely disposed open ends.

In addition, the convertible fishing lure assembly 10 includes a securing member 22 having an elongated configuration of sufficient dimension to dispose opposite ends of the securing member 22, as at leading end 24 and trailing end 26, adjacent the corresponding open ends 18 and 20 of the channel 16. Moreover, the securing member 22 is of sufficient dimension such that the opposite ends 24 and 26 simultaneously extend at least partially outward from the corresponding open ends 18 and 20 such as, for example, as illustrated in the embodiment of FIG. 1. As such, both the leading and trailing ends 24 and 26 of the securing member 22 are accessible and are disposed and structured for removable and replacable attachment of any of a variety of fishing tackle components including, but not limited to, various types of connecting structure 27 and 29. In turn, leaders, fishing line, etc., may be connected to the leading end 24 of the securing member 22, such as, via snap connector 27. Moreover, the securing member 22 may serve to interconnect a tackle component such as, but not limited to, a fish hook 31, to the trailing end 26, as is demonstrated in FIGS. 1 and 1A.

It is noted that the cross-sectional views of body sections 14, 14', 114, etc., presented throughout the attached drawings are representative of a solid body construction, for the sake of clarity, such as is the case for a lure constructed of wood or a similar material of construction. Of course, it is well established that most plastic lures comprise a semi-solid construction including one or more air chamber incorporated into the body of the lure to provide buoyancy and balance. In addition, weighted materials may be enclosed in the air chamber to compensate for the buoyant effects of the air chamber(s). Further, BB's or similar objects may be enclosed in an air chamber to provide a rattling effect to further serve to attract fish to strike at the lure. It is, thus, within the scope and intent of the present invention to encompass solid body lures as well as semi-solid and/or hollow lures, comprising wood, plastic, and other material of construction for body section(s) 14, 14', 114, etc.

Figure 10:
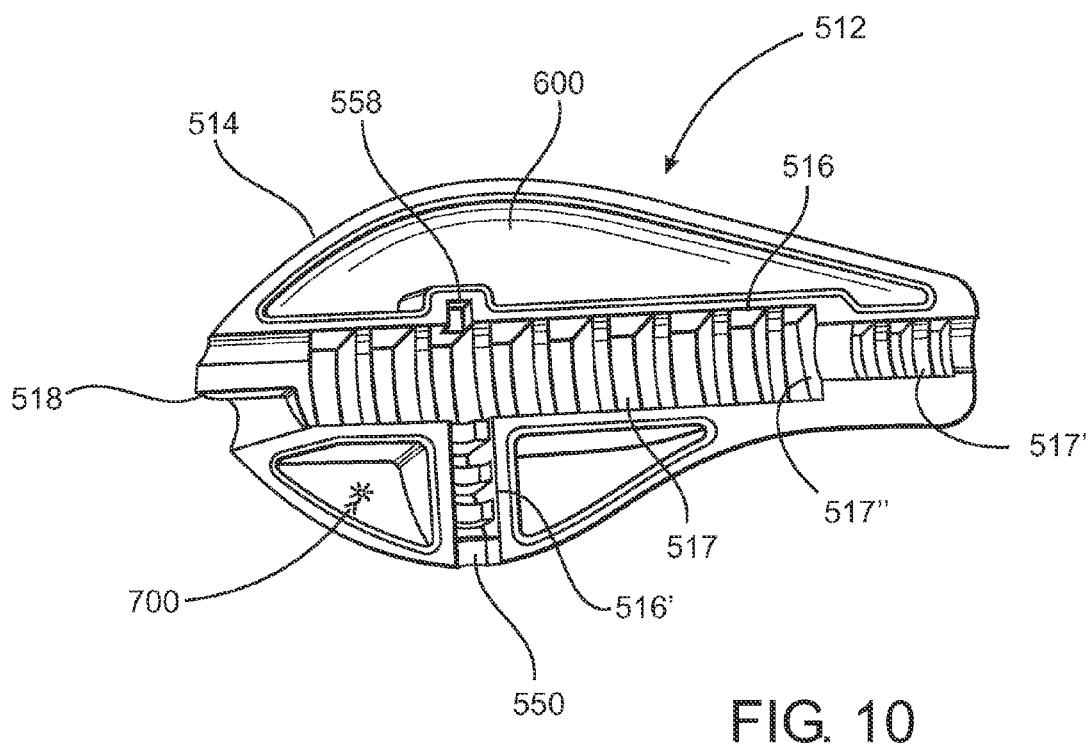
FIG. 10 is a cross-sectional perspective view of one illustrative embodiment of a substantially hollow lure body having a channel comprising an open cell configuration.
Figure 11:
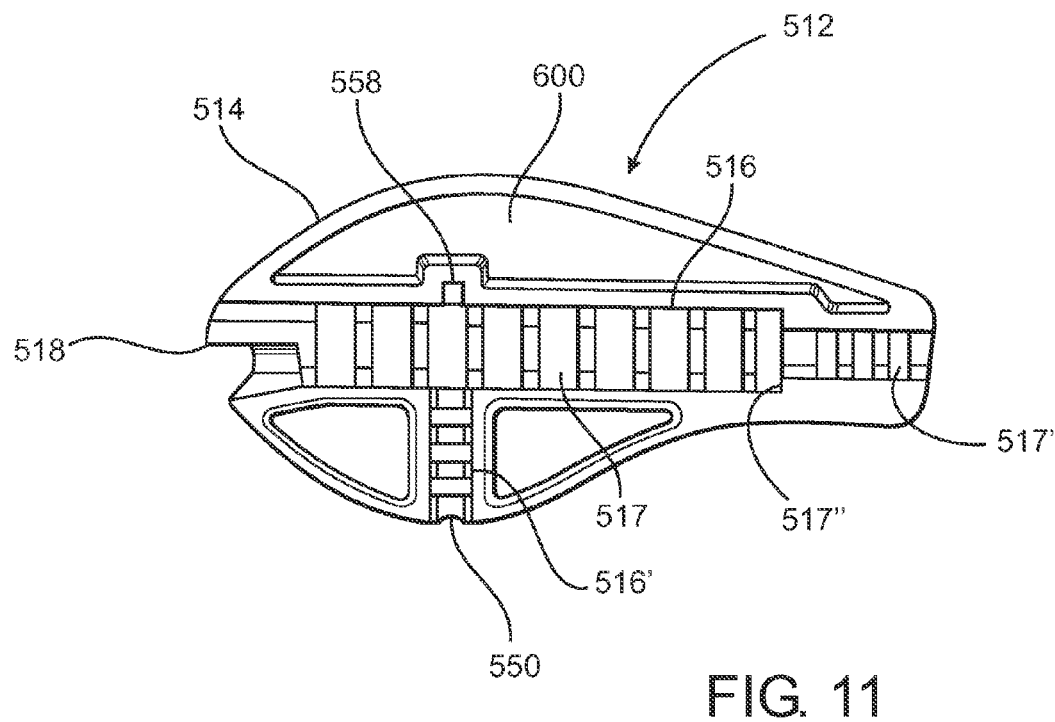
FIG. 11 is a cross-sectional elevation another illustrative embodiment of a substantially hollow lure body having a channel comprising an open cell configuration.

More in particular, and with reference to FIGS. 10 and 11, a lure body 512 in accordance with one embodiment of a convertible lure assembly 10 of the present invention comprises a body section 514 having a substantially hollow configuration. Further, the body section 514 includes an elongated interior channel 516 having oppositely disposed open ends including a leading open end 518 and a trailing open end 520. As before, the elongated channel 516 is configured to receive a securing member 22 therethrough which serves to interconnect a tackle component, in a similar manner as described above with reference to the illustrative embodiments of FIGS. 1 and 1A, as described in greater detail below. Elongated channel 516 in at least one embodiment is further dimensioned to receive a sleeve 40 therein, once again, as disclosed in greater detail below.

As before, an elongated channel 516 is substantially enclosed within the body section 514. In one embodiment, an elongated channel 516 comprises an open cell configuration which, in at least one embodiment, comprises a plurality of interconnected open cells. In one further embodiment, an elongated channel 516 comprises an open cell honeycomb configuration, such as shown best in the illustrative embodiments of FIGS. 10 and 11. As will be appreciated from the foregoing, a lure body 512 in accordance with the present invention can be constructed with a substantially hollow body section 514 which significantly decreases the material costs for constructing a convertible lure assembly 10 in accordance with the present invention. Further, an elongated interior channel 516 comprising an open cell configuration results in a further reduction in material costs.

Looking further to FIGS. 10 and 11, as a result of the substantially hollow configuration of the lure body 514, at least one air chamber 600 is formed within lure body 514. In at least one further embodiment, a substantially hollow lure body 514 comprises a plurality of discrete air chambers 600, such as may be formed therein via baffle walls or other such similar structure(s). As previously disclosed, an air chamber 600 provides buoyancy and balance to a lure body, such as, lure body 512. Of course, weighted materials can be enclosed in the air chamber 600 to compensate for the buoyant effects, as needed. Further, BB's or similar objects may be enclosed in an air chamber 600 to provide a rattling effect to further serve to attract fish to strike at the lure. Similarly, a scent emitting media may be enclosed in an air chamber 600, once again, to further serve to attract fish to strike. In at least one embodiment, a scent emitting media is disposed within at least some of the interconnected open cells of elongated channel 516 itself.

One embodiment of the present invention comprises at least one illumination member 700, such as is shown in FIG. 10, which serves as an additional attractant to entice a fish to strike. An illumination member 700 in accordance with at least one embodiment of the present invention comprises a self-contained light emitting diode, and as such, can be selected to emit any of a wide variety of visible light colors. Similarly, by employing a light emitting diode, an illumination member 700 in accordance with the present invention can be programmed to provide a continuous source of illumination or to emit light on a regular time interval. Further, a light emitting diode can be programmed to vary duration, intensity, and even color of the light emitted, as may be called for based on current fishing conditions. In at least one further embodiment, an illumination member 700 may be programmed to actuate based on motion a lure body 512 itself.

In embodiments where a lure body 12, 112, 212, 312, 412, 512, is constructed of plastic material of construction, different colors and/or thicknesses of the plastic material can be varied to effect the visibility of light emitted from an illumination member 700 disposed therein. As yet one further example, in an embodiment having an integral diving bill 56", 456, as is discussed further below, the integral diving bill 56", 456 may comprise a thinner plastic material of constructions so as to make integral diving bill 56", 456 a prominent illuminated member of the lure while in use. In yet one further embodiment, a replaceable diving bill 56 comprises an illumination member 700 therein, either in combination with an illumination member 700 within a lure body 12, or as an alternative thereto.

In at least some embodiments of the convertible fishing lure assembly 10, the securing member 22 is slidably positioned on the interior of the channel 16. As such, the channel 16 and the securing member 22 are cooperatively configured to have "sufficiently corresponding" cross-sectional configurations to substantially restrict rotational movement of the securing member 22 when disposed in the interior of the channel 16. Such cooperative and at least partially corresponding cross-sectional configurations of the channel 16 and securing member 22 are generally defined by each having an oblong cross-sectional configuration. More specifically, the cross-sectional configuration of the channel 16 may include a substantially oval or elliptical configuration extending along at least a portion thereof. However, in one or more embodiments the oval or elliptical cross-sectional configuration of the channel 16 extends along the entire length thereof. Alternatively, the oblong configuration of the channel 16 may be at least partially multi-sided, rather than truly elliptical or oval. Such a multi-sided configuration may be at least partially defined by the opposite, lateral, interior surfaces 16' of the channel 16 having a linear rather than curvilinear configuration, as represented throughout the figures.

In at least one further embodiment, the elongated channel 16 comprises a compound configuration, such as shown in the illustrative embodiments of FIG. 2A and FIG. 9. More in particular, compound elongated channel 16 comprises a first channel portion 17 having a first cross-sectional configuration and a second channel portion 17' having a second cross-sectional configuration. The interface of the first channel portion 17 and the second channel portion 17' at least partially defines a sleeve stop 17", as is discussed in great detail below.

In cooperation with elongated channel 16, the securing member 22 may also have what may be generally, but accurately, described as an oblong cross-sectional configuration. Moreover, the oblong configuration of the securing member 22 may be at least partially defined by a major or longer dimension and a minor or lesser dimension, which are disposed in transverse relation to one another. Accordingly, the "sufficiently corresponding" configurations of the channel 16 and securing member 22 can be further described as the securing member 22 having a cross-sectional configuration with a major or greater cross-sectional dimension being substantially the same as a major or greater cross-sectional dimension, e.g., a height, of the channel 16. Similarly, a minor or lesser cross-sectional dimension of the securing member 22 is substantially the same as a minor or lesser cross-sectional dimension, e.g., a width, of the channel 16. It is again emphasized that the "sufficiently corresponding" configurations of the channel 16 and securing member 22 prevent or at least restrict rotation of the securing member 22 within the channel 16, while still allowing a sliding insertion and removal of the securing member 22 relative to the interior of the channel 16. In a similar manner, in embodiments of a convertible fishing lure assembly 10 in accordance with the present invention comprising a sleeve 40, "sufficiently corresponding" configurations of the sleeve 40 and securing member 22 prevent or at least restrict rotation of the securing member 22 within the sleeve 40, while still allowing a sliding insertion and removal of the securing member 22 into and out of the interior of the sleeve 40.

Figure 1A:
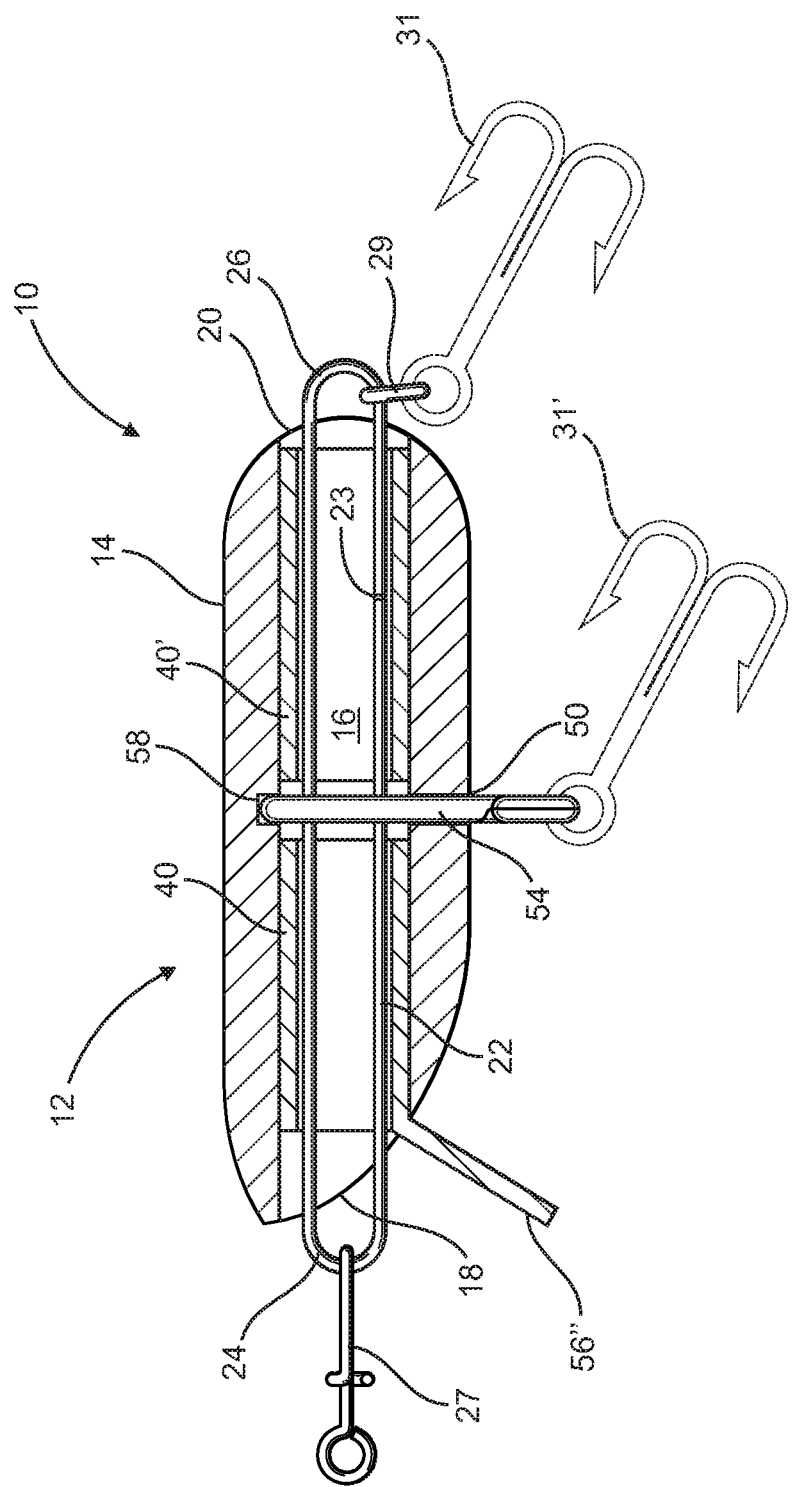
FIG. 1A is a longitudinal sectional view of another embodiment of the convertible lure assembly in accordance with the present disclosure illustrating a sleeve.
Figure 3:
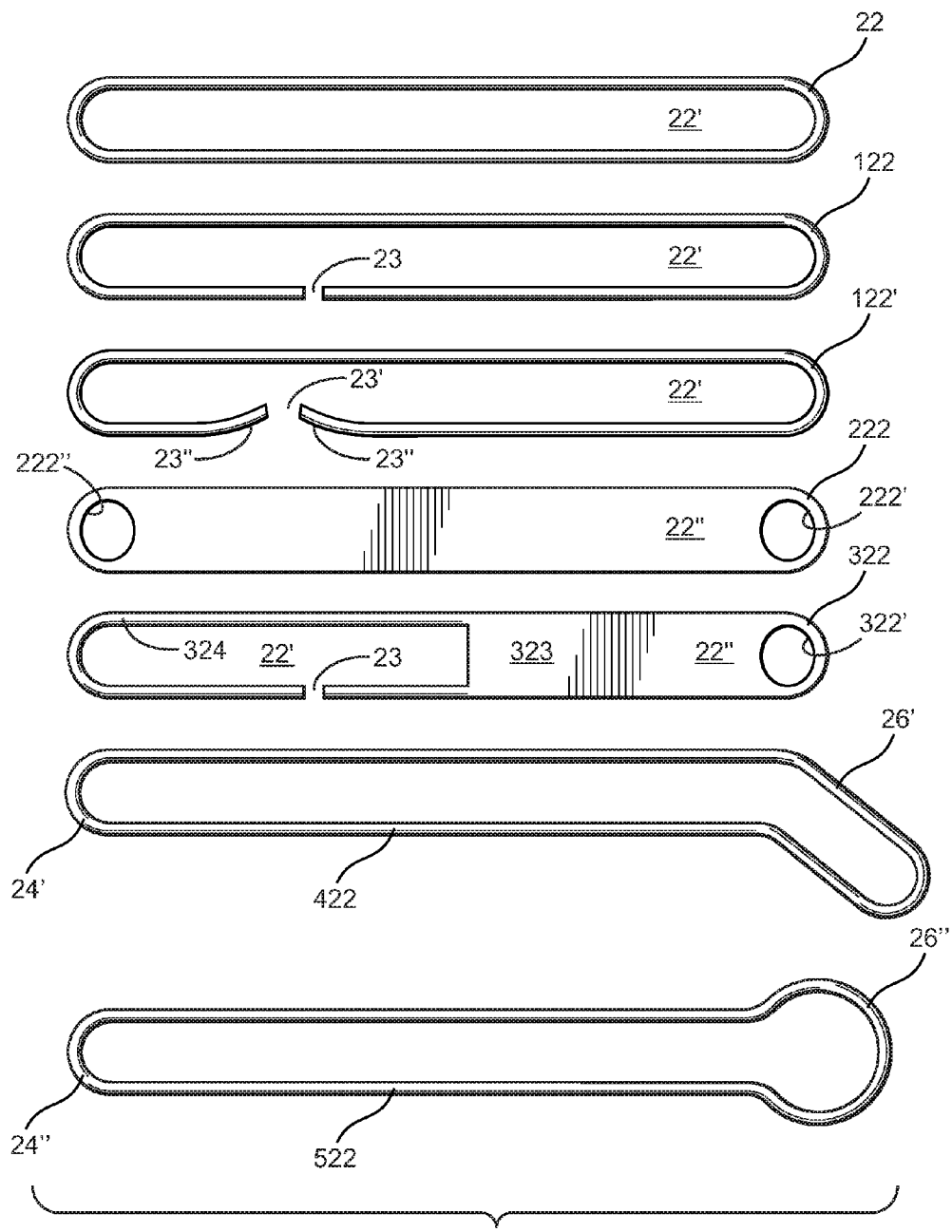
FIG. 3 is a collection of structural variations of a securing member which can be used with any of the embodiments of a lure assembly in accordance with the present disclosure.

With primary reference to FIG. 3, the structure of the securing member 22 may vary and still be capable of being used with any of the embodiments of the body 12 and/or body sections 14, 14', etc. Accordingly, as represented in FIG. 3, the securing member 22 may include an elongated loop-type structure and configuration wherein the loop of the securing member 22 is completely closed and defines an inner open area 22' between oppositely disposed longitudinal sides thereof. Alternatively, a securing member 122 may include an access opening, as at 23, defined by at least a minimal separation of the loop configuration of the securing member 122, thereby providing a direct physical opening into open area 22' through a portion of the securing member 122 itself. In use, various tackle components are connected to the continuous securing member 22 by being "snapped on" such as by a snap connector 27, as represented in FIGS. 1 and 1A. However, when utilizing the securing member 122 has an access opening 23, it may be at least partially removed from the interior of the channel 16, as shown in FIG. 7, and further removed until the access opening 23 is exposed on an exterior of the channel 16. When so exposed, an appropriate tackle component, such as, fishing hooks 31, 31' and/or connectors 27, 29 may pass through the access opening 23 and at least partially into open area 22', and the fishing hooks 31, 31' and/or connectors 27, 29 are slid onto and along the wire loop of securing member 122, 122', 322, etc. Although shown extending through the front of body section 14 in FIG. 7, it will be appreciated that a securing member 22 may be partially removed from either end of a channel 16, in order to allow removable and replacable interconnection of one or more tackle component, once again, such as, fishing hooks 31, 31' and/or connectors 27, 29, onto a portion of the securing member 22 and, therefore, to body section 14.

FIG. 3 illustrates a further embodiment of a securing member 122' having an access opening 23'. More in particular, and as clearly illustrated in FIG. 3, opposing ends 23" of securing member 122' which form access opening 23' are bent inwardly towards the side of the securing member 122' disposed opposite from access opening 23'. More in particular, opposing ends 23" are bent inwardly to facilitate slidably positioning the securing member 122' into and out of elongated channel 16, without snagging or otherwise catching the securing member 122' on or in elongated channel 16 at the access opening 23'. Similarly, bent opposing ends 23" of access opening 23' serve to facilitate slidably positioning the securing member 122' at least partially into and out of sleeve 40, once again, without snagging or otherwise catching the securing member 122' on or in sleeve 40 at access opening 23'.

In yet another embodiment, the securing member 222 is defined by substantially solid material construction wherein the opposite ends thereof include connecting opening as at 222' and 222". More in particular, a securing member 222 defined by a substantially solid material construction comprises a closed area 22" between its opposite longitudinal sides, such as shown in FIG. 3. Yet another embodiment of the securing member is represented as 322, wherein at least a portion of the securing member is formed from a substantially solid material construction having a closed area 22" and a remainder of the securing member 322 includes a loop segment 324 having an open area 22'. The loop segment 324 also may include an access opening 23, and a connecting opening 322' is provided through the closed area 22" for attachment of various tackle components as desired by the user, including the connecting structures 27, 29 and/or the fishing hooks 31, 31', as well as a variety of other types of fishing tackle components, as will be explained in greater detail hereinafter.

With further regard to FIG. 3, securing members 422 and 522 may also have the loop-type configuration similar to that of the securing members 22 and 122. However, in these embodiments, the structural modification of each includes an end portion, as at 26' and 26", respectively, having a different configuration. More specifically, the securing member 422 includes an angled trailing end portion 26', where as the securing member 522 includes an enlarged end portion 26". Each of these end portions 26' and 26" may be adaptively configured to correspond to various sizes and/or shapes of the plurality of lure bodies or lure body sections with which they may be used, such as those of the type represented in FIG. 6. As a result, the trailing ends 26' and 26" will be appropriately positioned relative to portions of a correspondingly shaped lure body 12, in order to facilitate the attachment of different fishing tackle components thereto. While the trailing ends 26 and 26" are illustrated in particular configurations, the opposite or leading ends of these or other securing members, as at 24' and 24" could also have a modified configuration or orientation, other than the represented straight line configuration. In addition, all of the different embodiments of a securing member in accordance with the present disclosure can be formed of spring steel or other appropriate material having sufficient strength, rigidity or other physical characteristics appropriate for the use of the securing member in combination with the rest of the convertible fishing lure assembly 10.

Figure 2:
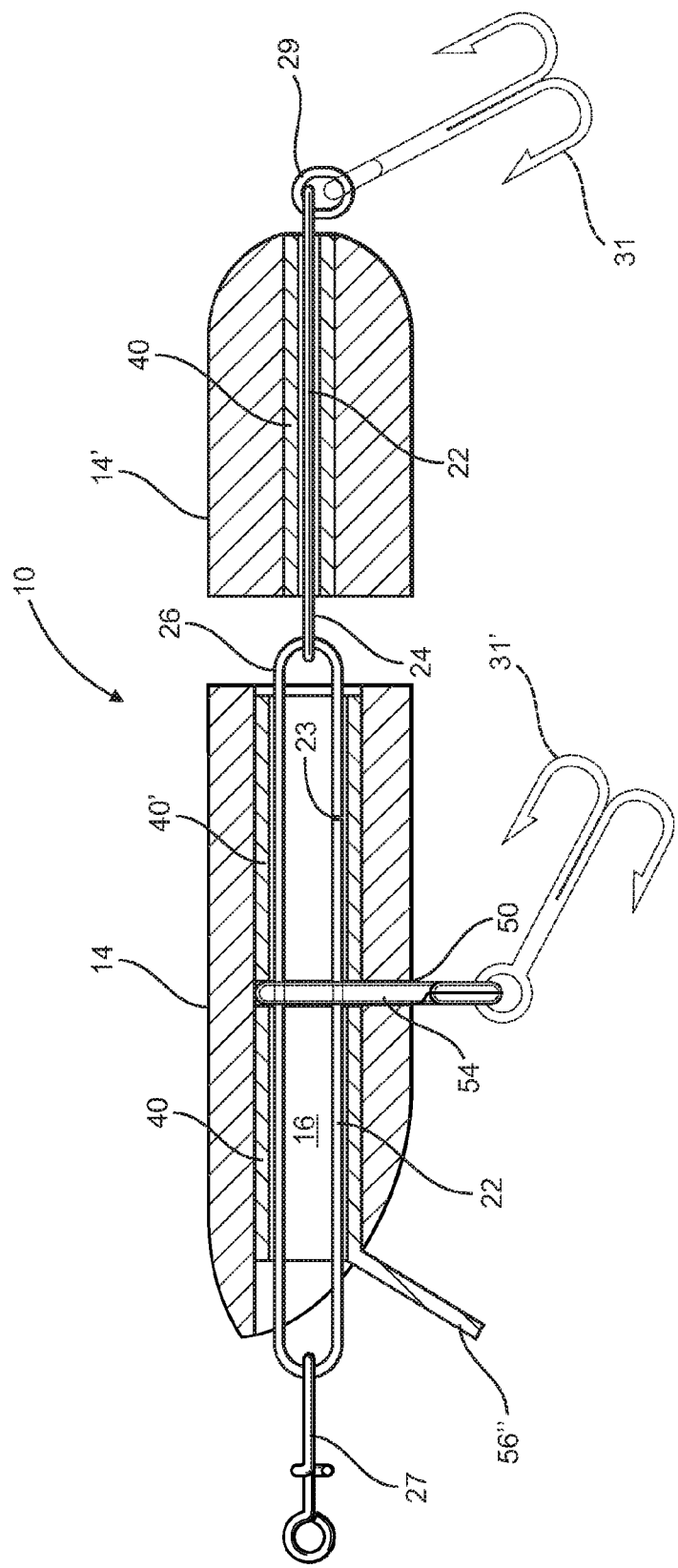
FIG. 2 is a longitudinal sectional view of yet another embodiment of the convertible lure assembly in accordance with the present disclosure.

With primary reference to FIG. 1A and FIG. 2, yet another embodiment of the convertible fishing lure assembly 10 of the present invention comprises at least one sleeve 40 and/or 40' disposed in one or more of the body sections 14 and 14' of the body 12. As clearly indicated in FIG. 2, the body 12 may include a plurality of body sections 14 and 14'. Alternatively, the body 12 may comprise a single body section 14, as represented in FIGS. 1 and 1A. More specifically, each sleeve 40 and/or 40' has a cross-sectional configuration substantially corresponding to that of the channel 16 in which it is disposed. As such, each of sleeves 40, 40' extend along at least a portion of the corresponding channel 16 and are dimensioned to allow passage of the securing member 22 through the interior of the sleeve 40, 40'. Each of the sleeves 40, 40' may be formed of a metallic or other appropriate material having sufficient rigidity or physical properties which restrict wear or deterioration of the corresponding channel 16 and/or other parts of the body section 14, 14'. Such deterioration may be typically caused by repeated insertion and removal of the securing member 22 relative to the channel 16 and in particular when the body section 14, 14' is formed from a less durable material, such as, but limited to wood.

An appropriately dimensioned sleeve 40 in accordance with the present invention may be mounted into a "soft body" type lure so as to permit replaceable attachment of a locking or double hook assembly to the soft body lure through sleeve 40. More in particular, a sleeve 40 comprising an oblong or oval cross-sectional opening will allow one end of a double hook assembly having a shank of sufficient length to pass therethrough, after which, a snap swivel or other connector is attached to the end of the double hook positioned into and through the sleeve 40, thereby securing the double hook assembly to the soft body lure. Further, release of the snap swivel or other connector allows for quick and easy removal and/or replacement of the double hook assembly from the soft body lure, without causing irreparable damage to the soft body lure, as would otherwise occur. The ability to remove the double hook assembly from the soft body lure allows for ease of storage and/or transportation of the soft body lures. The sleeve 40 in such an embodiment may be manufactured from metal or other weighted material if the soft body lure is intended to swim deep or "crawl" along the bottom. Alternatively, the sleeve 40 may be made from plastic or other buoyant material if it is desired for the soft body lure to swim or float on or near the surface. In one alternate embodiment, an appropriately dimensioned sleeve 40 is mounted into a "hard body" lure and a double hook assembly, once again, having a sufficient shank length, is replacably attachable to the hard body lure.

FIG. 2A and FIG. 9 are illustrative of one further embodiment of the present invention comprising a sleeve 40 or 140, respectively, disposed in channel 16. More in particular, in the illustrative embodiments of FIG. 2A and FIG. 9, the channel 16 comprises a compound configuration having a first channel portion 17 disposed in communication with a second channel portion 17', wherein the first channel portion 17 and second channel portion 17' comprise different effective cross-sectional areas. Further, the interface of the first channel portion 17 and second channel portion 17' defines a sleeve stop 17", as shown in FIG. 2A and FIG. 9. In the illustrative embodiments of FIG. 2A and FIG. 9, a sleeve 40, 140 is advanced into a channel 16 until the end of the sleeve 40, 140 inserted into the channel 16 abuts up against sleeve stop 17", thereby further securing the sleeve 40, 140 in an operative orientation within channel 16 of corresponding body section 14, 114.

A further feature presented in the illustrative embodiment of FIG. 2A is the incorporation of a plurality of chambers 19 in body sections 14 and 14' disposed along the length of the channel 16. More in particular, each chamber 19 is sized and configured to receive at least one enhancement member 19' therein while the convertible fishing lure assembly 10 is deployed in an operative manner. In at least one embodiment, one or more chamber 19 is disposed along a bottom portion of channel 16, however, it is understood that one or more chamber 19 may be disposed along the top portion of channel 16. In yet one further embodiment, one or more chamber 19 may be disposed along both the top and bottom portions of channel 16.

Enhancement members 19' are selected for various purposes, dependant on current fishing conditions, type of fish targeted, etc., and may include, by way of example only, attractants, such as scent emitting media or sound generating members, i.e., the enhancement member 19' rattles around in chamber 19 creating an audible/vibrational attractant. Alternatively, an enhancement member 19' may comprise a buoyancy adjustment member, such as a weighted member or a floatation member, so as to maintain the convertible fishing lure assembly 10 at a desired depth below the surface of the water while deployed.

In use, one or more enhancement member 19' is placed in channel 16, prior to the placement of sleeve 40 and/or securing member 22 therethrough, and the body section 14 is manipulated via movement by the user until each enhancement member 19' drops into a corresponding chamber 19. Once each enhancement member 19' is disposed in a corresponding chamber 19, the sleeve 40 or securing member 22 is disposed in an operative orientation in channel 16, thereby preventing the enhancement member(s) 19 from dislodging from said corresponding chamber(s) 19. Thus, enhancement members 19' further add to the versatility and functionality of the present convertible fishing lure assembly 10, allowing the user to quickly, conveniently, and replacably add or remove one or more enhancement member 19' to customize the lure assembly 10 for almost any fishing scenario.

As further set forth above, the lure body 12 includes one or more body sections 14, 14', each of which may be converted in function, structure and/or appearance by removably interconnecting one or more tackle components thereto. As set forth above, such tackle components may include the connecting structure 27, 29 and the fishing hooks 31, 31' which are typically connected to the leading or trailing ends of the securing member 22, as at 24 or 26. However, depending on the function of the tackle component as well as the fishing conditions to which the convertible fishing lure assembly 10 is subjected, it is sometimes desirable to removably attach various tackle components to one or both of the body sections 14 and 14' at an intermediate portion thereof, such as between the leading and trailing ends of the lure body 12.

Therefore, in at least one embodiment, a body section 14 includes one or more attachment openings 50 and/or 52 formed therein. As previously disclosed, the attachment openings 50 and/or 52 comprise discrete openings formed through the body section 14 and into a portion of the otherwise substantially enclosed channel 16, and are cooperatively sized, disposed, dimensioned and configured to receive a connecting portion 54 of a single one of a plurality of tackle components therein. More in particular, each discrete attachment opening 50 and/or 52 is cooperatively sized and configured to receive an aperture 54' of connecting portion 54 of a singular tackle component therethrough and into an operative orientation in the enclosed channel 16 for securing engagement with a securing member 22 or sleeve 40 therein. As used herein, cooperatively sized and configured shall mean that while a singular tackle component 54, 56 is operatively positioned into a discrete attachment opening 50 or 52, the discrete opening through the body section 14 into the channel 16 is substantially blocked by the singular tackle component 54, 56, such that no other tackle component or other similar structure can pass through the discrete opening into the channel 16.

Figure 5:
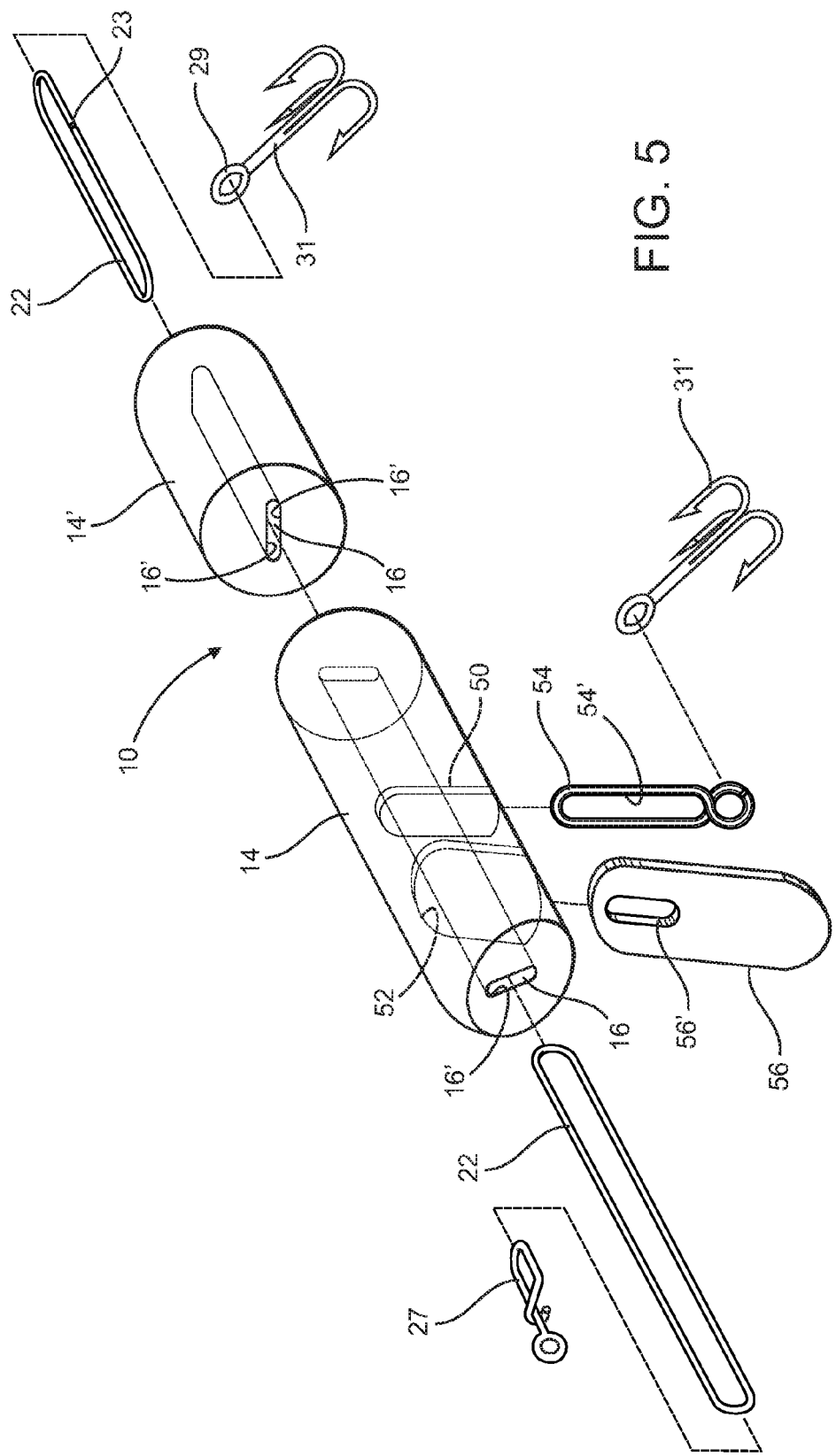
FIG. 5 is a perspective, exploded view of the embodiment of FIG. 4 in an unassembled form.

The attachment openings 50 and/or 52 are disposed, dimensioned and configured to receive any one of a plurality of tackle components therein, one at a time, such as connecting portion 54 used to interconnect fishing hooks 31' to the body section 14. Also, other tackle components such as a diving bill 56 may be interconnected to the body section 14 by being inserted a portion of the diving bill 56 into the attachment opening 52. Moreover, certain ones of the separate connecting portions 54 have an aperture 54' dimensioned and configured to pass into a corresponding attachment opening 50 and into substantial alignment with the interior channel 16, to facilitate connection of a hook 31' to the body section 14. As illustrated in FIG. 5, the connecting portion 54 comprises a snap ring configuration, however, it is understood to be within the scope and intent of the present application for the convertible fishing lure assembly 10 to comprise any of a plurality of connecting portions 54, such as split rings, or swivel 55 as is illustrated in FIG. 7, etc.

With reference to the illustrative embodiments of FIGS. 10 and 11, attachment opening 550 is aligned with an attachment opening channel 516' which, in at least one embodiment, is similar to elongated channel 516 and comprises an open cell configuration. Attachment opening channel 516' extends through the substantially hollow body section 514 towards elongated channel 516, and in at least one embodiment, attachment opening channel 516' interconnects with elongated channel 516. In at least one further embodiment, the attachment opening channel 516' terminates in an interior recess 558, similar to interior recesses 58 and 60, as described in detail below.

In at least one embodiment, a connector comprises a configuration similar to snap connector 27, such as is best shown in FIG. 5, except that the uppermost portion of the larger loop will comprise a flattened surface forming an at least partially rectangular loop configuration, and the "snap" portion of the larger loop will be permanently affixed to the interconnecting shaft, i.e., the larger loop cannot be opened without destroying the integrity of the same. In addition, in this embodiment, the distance between the larger loop and the smaller loop, i.e., the length of the interconnecting shaft, is minimized in accordance with available manufacturing practices, e.g., 1 to 1.5 millimeters. This configuration of a connector provides further stability of the connector and adjoining fishing hook 31' or other tackle component while disposed in an operative position through attachment opening 50 or 52.

Alternatively, in at least one embodiment, a tackle component comprising a one piece construction, such as diving bill 56, includes an opening or aperture 56' disposed in aligned relation with the interior channel 16, wherein the aperture 56' is dimensioned to receive a portion of securing member 22 or sleeve 40 therethrough so as to securely yet replacably retain the diving bill 56 in an operative orientation relative to body section 14 while the convertible fishing lure assembly 10 is deployed.

Figure 4:
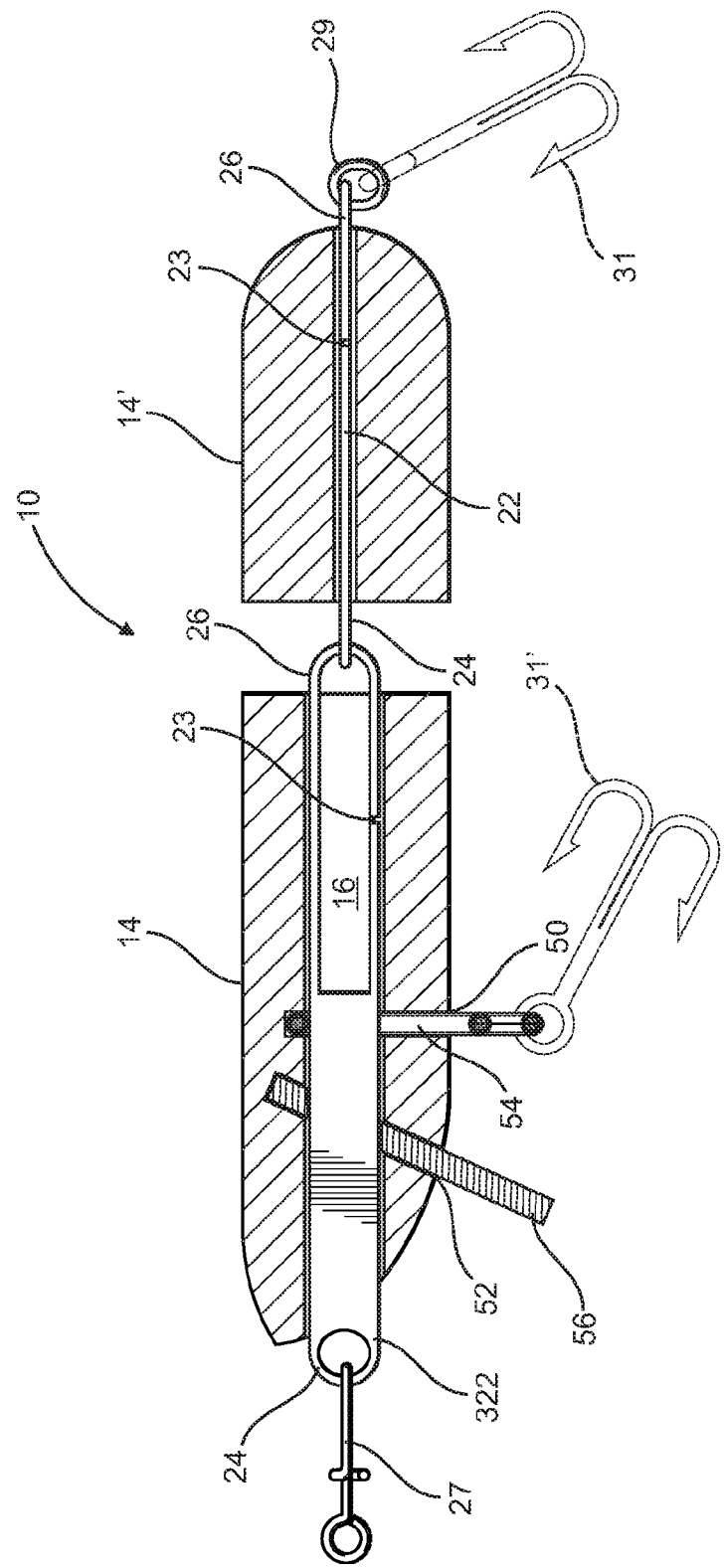
FIG. 4 is a longitudinal cross-sectional view of yet another embodiment of a lure assembly in accordance with the present disclosure, wherein the body of the lure assembly comprises plurality of body sections.

Although as shown in FIGS. 4 and 5, diving bill 56 comprises a generally flat, oval configuration, it is understood to be within the scope and intent of the present application for a convertible fishing lure assembly 10 to utilize any of a plurality of different diving bill configurations dictated by different fishing conditions. By way of example, a longer, broader bill oriented approximately in line with the length of a lure body is employed to cause a lure to dive deeper, whereas a shorter, thinner bill oriented at a steeper angle relative to the lure body will cause the lure to run shallow. As yet one other example, a "chugger" type lure comprises a bill structured to splash water along the surface in front of the lure as it is retrieved, so as to attract surface feeding species of fish. Additionally, variations in the length, width, depth, and contours of a diving bill 56 will necessary effect the action of the lure in the water, and the present application does not contemplate any limitation on diving bill configurations which may be employed with the convertible fishing lure assembly 10. The present invention further contemplates the use of diving bills 56 of different colors, so as to provide a further visual attractant feature to a convertible fishing lure assembly 10 in accordance with the present invention. As above, the different colored diving bills 56 are also readily interchangeable so as to add to the overall versatility of the present lure assembly 10. The use of different colors in lures allows a user to account for depth, water clarity, cloud cover, time of day, etc., because different colors absorb available light frequencies differently under different lighting conditions.

Accordingly, the separate connecting portions 54 of one or more of the tackle components and the one piece tackle components 56 are cooperatively dimensioned, configured and disposed, within corresponding ones of the attachment openings 50 and 52 such that the apertures 54' and 56' associated therewith are aligned with the interior of channel 16. This alignment allows the securing member 22 to pass through the channel 16 as well as through the respective apertures 54' and 56' of the corresponding connecting portion 54 and tackle component 56, thereby securely retaining and stabilizing the connecting portion 54 and tackle component 56 in operative orientations relative to the corresponding body section 14.

In at least one embodiment, the sleeve 40 passes through channel 16 as well as through the respective apertures 54' and/or 56' of the corresponding connecting portion 54 and/or tackle component 56 wherein the sleeve 40 securely retains and stabilizes the connecting portion 54 and/or tackle components 56 in an operative orientation relative to the corresponding body section 14. The securing member 22 in such an embodiment then passes through sleeve 40 with oppositely disposed ends 24, 26 simultaneously extending outwardly from opposite ends of channel 16. FIG. 2B is a cross-sectional view of the embodiment of FIG. 2A and is illustrative of an embodiment of the present invention wherein a sleeve 40 is disposed through an aperture 54' of a corresponding connecting portion 54 so as to securely retain and stabilize the connecting portion 54 in an operative orientation relative to the body section 14. FIG. 2A is further illustrative of securing member 22 disposed inside of sleeve 40, and further, of distal end 26 of securing member 22 of the forward body section 14 engaging the proximal end 24' of the securing member 22' of rearward body section 14'.

Additional stability is added to at least some embodiments by including an interior recess as at 58 and 60. Such interior recess 58 and 60 are in substantially linear alignment with the attachment opening 50 and 52, respectively, so as to engage and at least partially retain the innermost end of the corresponding connecting portion 54 and/or tackle component 56. In at least one embodiment, connecting portion 54 comprises a coating of a resilient material in order to provide a snug friction fit of the connecting member 54 within attachment opening 50 and interior recess 58. Any of a number of polymeric materials may be employed as a coating for connecting portion 54.

Positioning of the sleeves 40 and 40' in channel 16 is represented in FIGS. 1A and 2. As shown in the figures, the corresponding ends of the sleeves 40 and 40' may be disposed in confronting relation with a connecting portion 54, thereby providing stability to the placement of the connecting portion 54 when inserted into the channel 16 intermediate the ends of the body section 14. However, when the recess 58 is provided within the channel 16 to receive and retain the inner end of the connecting portion 54, the corresponding ends of the sleeves 40 and 40' may be at least partially spaced from the connecting portion 54, as represented in FIG. 1A. Also, a tackle component, such as the diving bill 56", may be integrally secured to one of the sleeves 40 and be attached to the body section 14 with the sleeve 40, as illustrated in FIGS. 1A and 2, rather than a diving bill 56 being independently attached to the body section 14, as is illustrated in FIG. 1.

In the embodiment of FIG. 9, a diving bill 156 is integrally formed with sleeve 140. In this embodiment, the sleeve 140 is structured to pass through an aperture of a connecting portion or other tackle component, thereby securely retaining and stabilizing the connecting portion or tackle component in an operative orientation relative to body section 114. FIG. 9 is further illustrative of an embodiment of a body section 114 comprising a compound channel 16, having first channel portion 17 and second channel portion 17' forming sleeve stop 17", against which the end of sleeve 140 inserted into compound channel 16 abuts for further support and stability while disposed in an operative engagement with body section 114.

FIGS. 10 and 11 are illustrative of a further embodiment of a body section 514 in accordance with the present invention comprising a compound channel 516, having a first channel portion 517 and second channel portion 517' forming sleeve stop 517", against which the end of a sleeve 40 inserted into compound channel 516 abuts for further support and stability. Although illustrated in FIGS. 10 and 11 comprising a compound channel 516, it is understood to be within the scope and intent of the present invention to provide a substantially hollow body section 516 having an elongated channel 516 which does not include a sleeve stop 517", or stated otherwise, an elongated channel 516 having a uniform internal cross-sectional configuration along its entire length. Similarly, it is understood to be within the scope and intent of the present invention to provide a substantially hollow body section 516 having an elongated channel 516 which does not comprise an open configuration, and rather, comprises a substantially closed configuration, with the exception of open ends 518, 520, and, in at least one embodiment, an interconnection with an attachment opening channel 516'.

As best illustrated in FIG. 9A, diving bill 156 further comprises raised dimples or engagement members 158 on each side of the sleeve 140, which extend slightly outwardly from the topmost surface of diving bill 156. Looking further to FIG. 9, the upper lip of body section 114 includes a recess or detent 114' which is sized and positioned to snuggly yet removably retain a corresponding engagement member 158 of diving bill 156 therein. As will be appreciated, in at least one embodiment, a pair of engagement members 158 may be disposed on opposite sides of sleeve 140 and a corresponding pair of detents 114' may be disposed on the upper lip of body section 114 on opposite sides of the channel 16 so as to provide further stability to the diving bill 156, sleeve 140, and body section 114 when disposed in an operative orientation relative to one another. Specifically, the combination of engagement members 158 and detents 114' further facilitate stable yet removable retention of the sleeve 140, and corresponding diving bill 156, in the channel portion 16 of body section 114. It will be further appreciated that engagement member(s) 158 may be disposed on body section 14, 114, while one or more detent 158 is disposed in diving bill 156 and/or sleeve 40, 140.

Similarly, in at least one embodiment, a replaceable diving bill 56 comprises one or more raised dimple or engagement member 158 formed thereon which engages a corresponding recess or detent 114' formed in a body section 14 of a lure body 12, each corresponding recess or detent 114' sized and positioned to snuggly yet removably retain a corresponding engagement member 158 of the replaceable diving bill 56 therein. In at least one embodiment, one or more recess or detent 114' is formed in a discrete attachment opening 50, 52 of the body section 14.

FIGS. 9 and 9A are further illustrative of a diving bill 156 comprising a compound slope configuration. More in particular, the diving bill 156 includes a substantially flat topmost surface on which engagement members 158 are disposed. As may be seen from FIG. 9, the substantially flat topmost surface of diving bill 156 is disposed essentially co-planar with a longitudinal axis through channel 16 of body section 114. Extending outwardly and downwardly from the substantially flat topmost surface is a first face 156'. Moreover, extending outwardly and downwardly from the first face 156' is a second face 156". FIG. 9 further illustrates that the slope of the first face 156' is different than the slope of the second face 156", and that each slope is different relative to a longitudinal axis through the channel 16 of body section 114. As shown, the slope of the second face 156" is greater than the slope of the first face 156'. However, it is within the scope and intent of the present invention for the slope of the first face 156' to be greater than the slope of the second face 156". Further, additional faces may be provided, each having a different slope relative to one another and/or to a longitudinal axis though channel 16 of body section 114. It is believed that presentation of a fishing lure 10 comprising the unique combination of a first face 156' and a second face 156" each having a different slope relative to one another and the spade-like configuration of diving bill 156 as shown in FIGS. 9 and 9A, into a body of water at trolling or even cast and retrieve speeds will provide additional and improved action to the fishing lure 10, thereby further and advantageously attracting more desired targeted fish to the area, and increasing the occurrences of a strike. Of course, it is within the scope and intent of the present invention for a sleeve 40 to comprise an integral diving bill 56" having a single face and a single slope, as is shown in FIG. 1A and FIG. 2.

As illustrated throughout the figures, the body 12 may include at least one body section 14 or a plurality of interconnecting body sections 14, 14', etc. Accordingly, once assembled and in use, the tackle components connected to the leading and trailing end of the body sections 14, 14' etc., will assume a substantially transverse orientation to the corresponding securing members 22. By way of example, and as represented in FIGS. 1 and 1A, the snap connector 27 once connected to the leading end 24 of the securing member 22 will normally, i.e., automatically, assume a transverse relation thereto. Similarly, the connector 29 as well as the corresponding fishing hook 31 will also "automatically" assume a transverse dimension to the trailing end 26 of securing member 22.

With regard to lure bodies having more than one body section as at 14 and 14', as represented in FIG. 4, interconnecting securing members will also automatically or typically assume a transverse relation to one another. Such an automatic or normal transverse orientation of the various tackle components 27 and 29 will prevent or significantly restrict these components from passing into or through corresponding leading and trailing ends of the channel 16, as previously stated. Similarly, as represented in FIGS. 2 and 4, the corresponding ends of the securing members 26 and 24 will be automatically transversely oriented relative to one another. Similarly, in at least one embodiment, the oblong cross-sectional configuration of the channels 22 of adjacent ones of interconnected body sections 14 and 14' are also disposed in substantially transverse relation to one another as well as the securing members 22 contained therein.

A further advantage of the convertible fishing lure assembly 10 in accordance with the present invention is the ability to attach a soft body lure such as, by way of example, a plastic worm, to the back of a body section 14, thereby allowing a user to troll with a lure, once again, such as a plastic worm, that is not intended, and often, not even possible to use or control in a trolling situation. More in particular, plastic worms, and many other soft body type lures are not hydraulically shaped or weighted so as to be amenable for trolling at even moderate speeds, however, by attaching such a lure to a body section 14 in accordance with the present invention, almost any lure can be made to 'swim' while trolling. Further, the ability to quickly, easily, and replacably attach and remove any of a variety of other lures to a first body section 14 allows a user to quickly and easily test a variety of lures, by replacably attaching the same at the rear of a body section 14.

Figure 6:
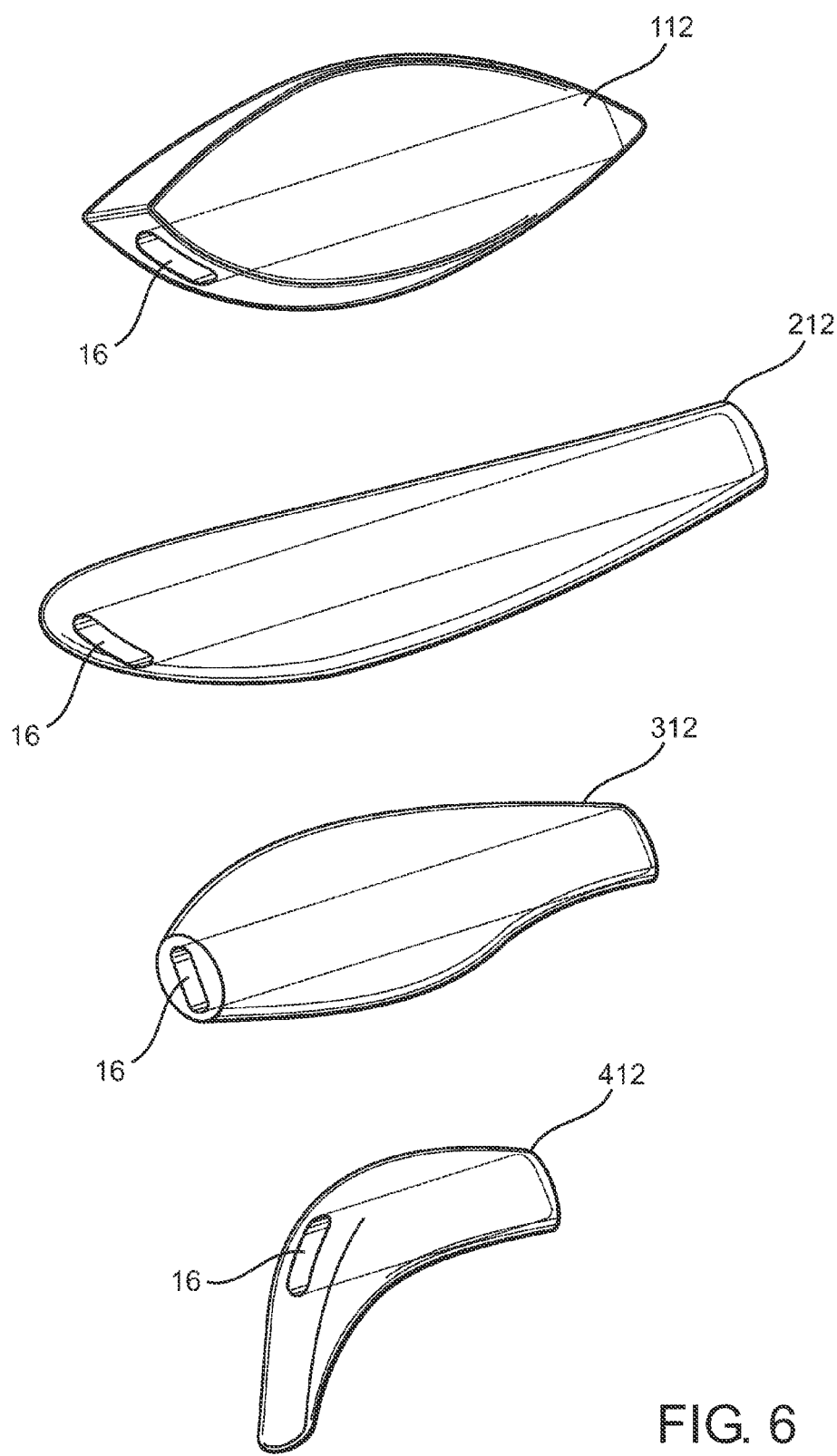
FIG. 6 is a collective view representing some, but not all, of different possible sizes and configurations of a body of a convertible lure assembly in accordance with the present disclosure.

As represented in FIG. 6, the bodies of the convertible fishing lure assembly 10 can assume a variety of different sizes and configurations, wherein the lure bodies represented in FIG. 6 are examples only of a much larger number of lure bodies having a larger variety of sizes, configurations, etc. As one example, lure body 112 comprises a wider transverse configuration, wherein the channel 16 extends there through in a manner illustrated in FIG. 6. In contrast, the lure body 212 includes a substantially elongated, somewhat linear configuration, however, once again, the channel 16 extends there through in the manner indicated. In yet another embodiment, the lure body 312 demonstrates yet another variation in size and configuration, wherein the channel 16 extends through a substantially central portion thereof as indicated.

One example of a more pronounced structural modification includes a lure body 412 having a severely angled leading portion, such as, a lure having an integral diving bill 456, wherein the central channel 16 extends linearly through the upper or main portion of the body 412, once again, as illustrated in FIG. 6. More in particular, lure body 412, as well as any other lure body 12, 112, 212, 312, 512, etc., in accordance with the present invention may comprise an integral diving bill such as 456. In at least one embodiment, an integral diving bill 456 is molded in place together with the lure body 12, 112, 212, 312, 412, 512. In at least one further embodiment, a replaceable diving bill, such as, by way of example, replaceable diving bill 56 as shown in FIGS. 4 and 5, is securely or fixedly attached to a lure body 12, 112, 212, 312, 412, 512, such as via adhesive, heat welding, fusing, etc., thereby serving essentially as a lure body 12, 112, 212, 312, 412, 512, having an integral diving bill 456 affixed thereto.

As previously stated above, with reference to diving bill 56, an integral diving bill 456, in accordance with the present invention can comprise any of a plurality of configurations, depending on the type of action desired for a particular lure body 12, 112, 212, 312, 412, 512. Once again, and by way of example, a longer, broader bill oriented approximately in line with the length of a lure body is employed to cause a lure to dive deeper, whereas a shorter, thinner bill oriented at a steeper angle relative to the lure body will cause the lure to run shallow. As yet one other example, a "chugger" type lure comprises a bill structured to splash water along the surface in front of the lure as it is retrieved, so as to attract surface feeding species of fish. Additionally, variations in the length, width, depth, and contours of an integral diving bill 456 will necessary effect the action of the lure in the water, and the present application does not contemplate any limitation on diving bill configurations which may be employed with the convertible fishing lure assembly 10. The present invention further contemplates the use of integral diving bills 456 of different colors, so as to provide a further visual attractant feature to a convertible fishing lure assembly 10 in accordance with the present invention. The use of different colors in lures allows a user to account for depth, water clarity, cloud cover, time of day, etc., because different colors absorb available light frequencies differently under different lighting conditions.

FIG. 7 represents yet another embodiment of a convertible fishing lure assembly 10 in accordance with the present disclosure. More in particular, as illustrated in the embodiment of FIG. 7, a tackle component such as a hook 31 is connected to body section 14 at a location intermediate thereof. In addition, the fish hook 31 is connected to a modified attachment opening generally indicated as 50', wherein the connecting portion 55 is in the form of a swivel connector. As such, connecting portion or swivel connector 55 includes a main swivel member 55' and a leading member 57 having an aperture 57'. Accordingly, the attachment opening 50' includes an enlarged entry 51 shaped and dimensioned to accommodate placement of the swivel 55'. As a result the leading portion 57 will pass through the enlarged opening 51 into alignment with the access opening 23 formed in the securing member 22. While still aligned, the securing member 22 will be moved in the direction indicated by arrow 100, thereby serving to pass a portion of the securing member 22 through the aperture 57' and thereby connect the leading portion 57 onto the securing member 22 in the manner illustrated in FIG. 7A. This embodiment also disclose a diving bill 56 passing through attachment opening 52 and having a central aperture 56' aligned with the channel 16 while the its inner end is disposed in recess 60. A trailing hook 31 may be incorporated into the embodiment of FIG. 7, however, in this instance, the hook 31 is mounted to the securing member 22 and then securing member 22 is inserted into the body section 14 from the rear, such that access opening 23 is disposed nearer the front of the body section 14 when the securing member 22 is fully inserted therein.

FIG. 8 discloses one embodiment of a tackle box or like lure/tackle carrying assembly 200, including a closeable lid 201 and a base portion 202. The base 202 includes a plurality of segregated compartments arranged in rows or other relative orientations as at 203, 204 and 205. Each of the rows includes a plurality of compartments, as indicated, which are dimensioned and configured for the containment of various portions of the convertible fishing lure assembly 10 of the present invention. By way of example, the row 203 may include a plurality of compartments each having a different dimension and/or configuration, wherein the compartments are adapted to retain a plurality of body sections 14, 14' of different sizes and configurations. Row 204, by way of further example, may include a plurality of compartments which are adapted to a hold and retain a plurality of securing members 22 which may have varying structural configurations and/or dimensions, as represented in FIGS. 3 and 8. Row 205 may include a plurality of differently sized and configured compartments intended for the placement of a plurality of tackle components, such as hooks 31, which collectively define a tackle assembly. As is well known, the mingling of fish hooks in a common compartment or area will invariably result in there entanglement. As a result, the number of compartments in the row 205 can vary to accommodate a relatively large number of fish hooks or other appropriate tackle components defining the tackle assembly.

Figure 8A:
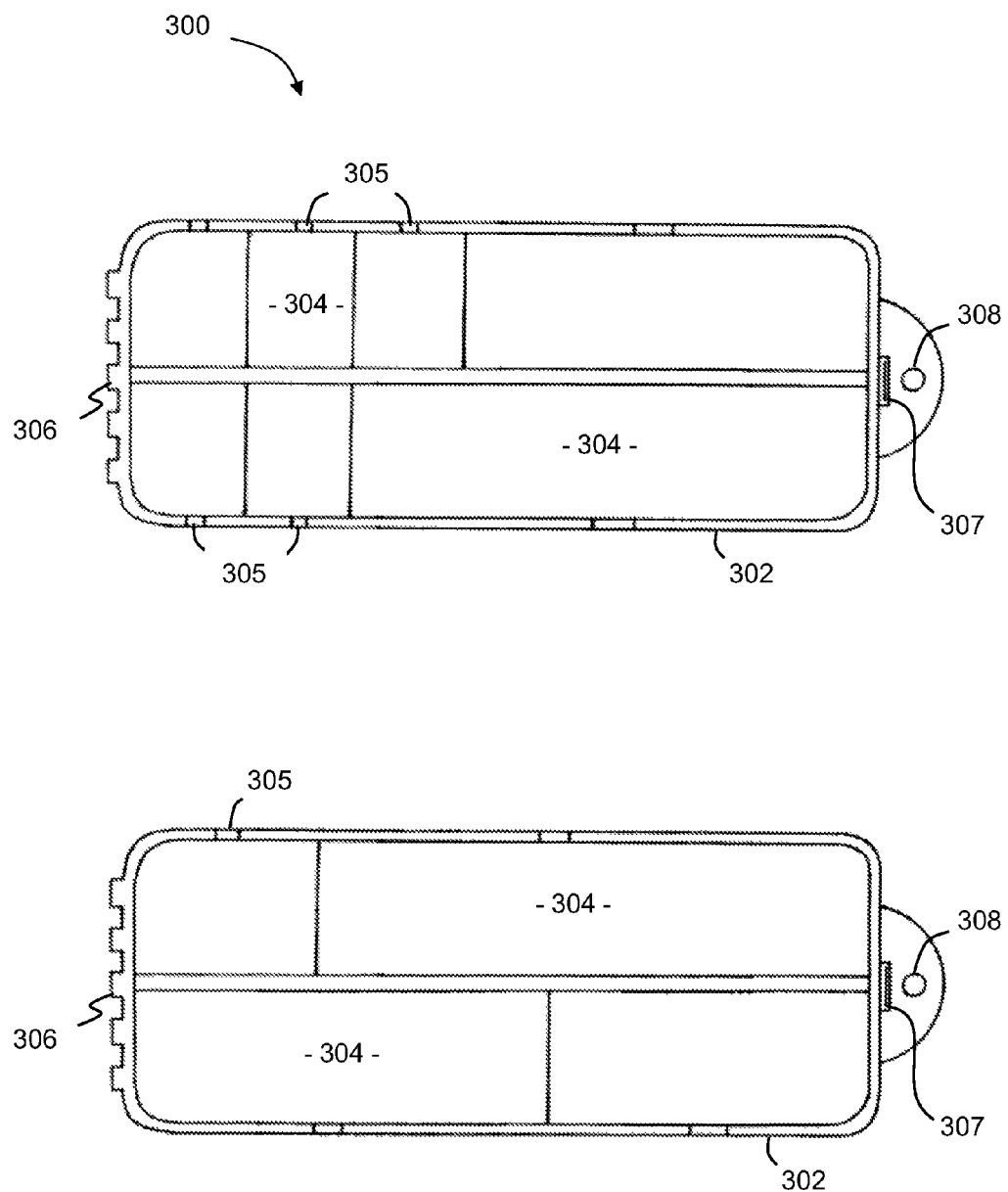
FIG. 8A presents top plan views of separate halves of one alternate embodiment of a lure and tackle storage and carrying assembly in accordance with the present disclosure.

FIG. 8A presents top plan views of separate halves 302 of one alternate embodiment of a lure and tackle storage and carrying assembly 300. As seen from the figure, the halves 302 of the lure and tackle box 300, while comprising overall substantially similar shapes and sizes, each comprise a plurality of different sized storage compartments 304. The various storage compartments 304 are dimensioned to hold one or more components of a convertible fishing lure assembly 10 in accordance with the present invention, including body sections 14, securing members 22, sleeves 40, connecting portions 54 and other tackle components 56, as well as a variety of standard lures and/or tackle. Of note is that each compartment 304 of each half 302 of the lure and tackle storage and carrying assembly 300 comprises a separate lid having a latch or tab 305 to securely retain the lid for a particular storage compartment 304 in a closed position while not in use. A further feature of the lure and tackle storage and carrying assembly 300 is that the two halves 302 may be joined together via complimentary piano hinges 306, and retained in a closed and facing orientation via complimentary locking tabs 307. An aperture 308 through a tab on one or both halves 302 of the lure and tackle storage and carrying assembly 300 may be used to affix a rope or cord to facilitate transport of the lure and tackle storage and carrying assembly 300 on a person's body while in use.

In one further embodiment, a bag or pouch is provided to store and/or transport securing members 22, tackle components, such as hooks 32, diving bills 56, etc., which a shore or bank fisherman can easily carry in a pocket or attach to a belt. Further, the shore or bank fisherman can carry a plurality of body sections 14, 14' of different sizes and configurations in another pocket such that he or she is free to travel along a shore or bank to fish, while having all of the components required to assembly a convertible fishing lure assembly 10 to accommodate any of a wide variety of fishing conditions which he or she may encounter.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A convertible fishing lure assembly comprising:
   a lure body including at least one body section,
   said body section including a channel disposed substantially within said body and extending longitudinally therethrough and terminating in oppositely disposed open ends,
   an elongated securing member formed of a rigid material of construction and having opposite ends, said elongated securing member disposable into and through said channel, said opposite ends of said elongated securing member extending at least partially outward from different ones of said oppositely disposed open ends of said channel concurrent to said elongated securing member disposed in an operative orientation within and through said channel,
   said elongated securing member and said channel comprising substantially corresponding cross-sectional configurations extending along at least a majority of respective lengths thereof,
   said substantially corresponding cross-sectional configurations cooperatively shaped to restrict rotation of said elongated securing member within said channel and relative to said body section,
   each of said opposite ends of said elongated securing member disposed for removable and replaceable interconnection of at least one tackle component thereto,
   said body section comprising at least one discrete attachment opening formed therein in a communicating relation with said channel, said at least one discrete attachment opening cooperatively sized and configured to receive a singular tackle component therein,
   at least one singular tackle component including an aperture formed therethrough and removably and replaceably disposed in an operative position into said at least one discrete attachment opening, and
   said operative position comprising said aperture disposed in an aligned relation within said channel and at least a portion of said securing member positioned through said aperture in a retaining relation to said at least one singular tackle component.

2. The convertible fishing lure assembly as recited in claim 1 further comprising an interior recess formed in said body section in communicating relation with said channel and in an aligned relation with said at least one discrete attachment opening, said operative position further comprising said singular tackle component including an innermost end disposed in a retained relation within said interior recess.

3. The convertible fishing lure assembly as recited in claim 1 wherein said body section comprises a diving bill integrally formed therewith.

4. The convertible fishing lure assembly as recited in claim 1 further comprising a diving bill having an illumination member mounted therein.

5. The convertible fishing lure assembly as recited in claim 1 further comprising a replaceable diving bill removably disposable into and out of an operative position in said at least one discrete attachment opening.

6. The convertible lure assembly as recited in claim 5 wherein said replaceable diving bill comprises at least one engagement member, and said at least one discrete attachment opening comprises at least one detent, wherein said at least one detent is sized and positioned to snuggly yet removably retain said at least one engagement member of said replaceable diving bill therein.

7. The convertible lure assembly as recited in claim 1 wherein said lure body comprises a plurality of discrete attachment openings.

8. The convertible fishing lure assembly as recited in claim 7 further comprising a replaceable diving bill removably disposable into and out of an operative position in one of said plurality of discrete attachment openings.

9. The convertible lure assembly as recited in claim 8 wherein said replaceable diving bill comprises an engagement member, and said one of said plurality of discrete attachment openings comprises a detent, wherein said detent is sized and positioned to snuggly yet removably retain said engagement member of said replaceable diving bill therein.

10. The convertible fishing lure assembly as recited in claim 1 further comprising a plurality of singular tackle components each including an aperture formed therethrough which is removably and replacably disposed in an operative position into said at least one discrete attachment opening, wherein said operative position comprises said aperture of one of said plurality of singular tackle components disposed in an aligned relation within said channel and at least a portion of said elongated securing member is positioned through said aperture in a retaining relation to said one of said plurality of singular tackle components.

11. A convertible fishing lure assembly comprising:
a lure body including a plurality of body sections movably interconnected to one another,
at least one of said plurality of body sections including an elongated channel extending longitudinally therethrough and terminating in oppositely disposed open ends thereof,
at least one of said plurality of body sections comprising a continuous compound elongated channel having at least a first channel portion comprising a first cross-sectional configuration and a second channel portion comprising a second cross-sectional configuration, said first cross-sectional configuration and said second cross-sectional configuration comprising different effective cross-sectional areas, a sleeve stop defined at the interface of said first channel portion and said second channel portion such that one end of a sleeve removably disposed into one of said first channel portion or said second channel portion abuts said sleeve stop so as to stabilize said sleeve therein,
a securing member removably disposable through said elongated channel of said at least one of said plurality of body sections, said securing member and said elongated channel comprising substantially oblong, corresponding cross-sectional configurations, extending along at least a majority of respective lengths thereof,
said substantially oblong, corresponding cross-sectional configurations being cooperatively shaped to restrict rotation of said securing member within said elongated channel and relative to said at least one of said plurality of body sections,
said securing member including opposite ends disposed in accessible relation to each of said open ends of said elongated channel of said at least one of said plurality of body sections for removable and replaceable interconnection of at least one tackle component thereto,
said at least one of said plurality of body sections comprising at least one discrete attachment opening formed therein in communicating relation with said elongated channel of said at least one of said plurality of body sections, said at least one discrete attachment opening cooperatively sized and configured to receive a singular tackle component therein,
said singular tackle component removably and replacably disposable into and out of an operative position in said one discrete attachment opening, said singular tackle component including an aperture formed therein, and
said operative position comprising said aperture disposed in an aligned relation within said elongated channel and at least a portion of said securing member is positioned through said aperture in a retaining relation to said singular tackle component.

12. The convertible lure assembly as recited in claim 11 wherein said sleeve is removably disposed within said elongated channel of at least one of said plurality of body sections and comprising a cross-sectional configuration substantially corresponding to said elongated channel, said sleeve further dimensioned to removably receive said securing member therethrough.

13. The convertible fishing lure assembly as recited in claim 11 wherein at least one of said plurality of body sections comprises at least one chamber dimensioned to receive and replacably retain at least one enhancement member therein.

14. The convertible lure assembly as recited in claim 11 wherein at least one of said plurality of body sections comprises a flexible material of construction.

15. A convertible fishing lure assembly comprising:
a lure body including at least one body section,
said body section comprising a substantially hollow configuration having a channel disposed entirely within said body and extending longitudinally therethrough and terminating in oppositely disposed open ends, said channel including an open cell configuration comprised of a plurality of interconnected open cells,
a securing member formed of a rigid material of construction and having opposite ends disposable into and through said channel, said opposite ends of said securing member structured to extend at least partially outward from different ones of said oppositely disposed open ends of said channel,
said elongated securing member and said channel comprising substantially oblong, corresponding cross-sectional configurations extending along at least a majority of respective lengths thereof,
said substantially oblong, corresponding cross-sectional configurations being cooperatively shaped to restrict rotation of said elongated securing member within said channel and relative to said body section,
each of said opposite ends of said securing member disposed for removable and replaceable interconnection of at least one tackle component thereto,
said one body section comprises at least one discrete attachment opening formed therein and cooperatively sized and configured to receive a singular tackle component therein, and
at least one singular tackle component including an aperture formed therethrough which is removably and replacably disposed in an operative position into said at least one discrete attachment opening, said operative position comprising said aperture disposed in an aligned relation within said channel and at least a portion of said securing member positioned through said aperture in a retaining relation to said at least one singular tackle component.

16. The convertible lure assembly as recited in claim 15 wherein said substantially hollow body section comprises at least one air chamber formed therein which provides buoyancy and balance to said substantially hollow body section.

17. The convertible lure assembly as recited in claim 15 wherein said substantially hollow body section further comprises an attachment channel disposed between said at least one discrete attachment opening and said channel.

18. The convertible lure assembly as recited in claim 17 wherein said attachment channel comprises an open cell configuration.

19. The convertible lure assembly as recited in claim 15 wherein a scent emitting media is disposed in at least some of said plurality of interconnected open cells of said channel.

20. The convertible lure assembly as recited in claim 1 wherein said elongated securing member is at least partially movably disposed within said channel.

\* \* \* \* \*